United States Patent [19]
Corrington et al.

[11] Patent Number: 6,076,142
[45] Date of Patent: Jun. 13, 2000

[54] USER CONFIGURABLE RAID SYSTEM WITH MULTIPLE DATA BUS SEGMENTS AND REMOVABLE ELECTRICAL BRIDGES

[75] Inventors: Richard A. Corrington, Tustin; Steve M. Buu, Irvine; Alan B. Gordon, Costa Mesa, all of Calif.

[73] Assignee: Ampex Corporation, Redwood City, Calif.

[21] Appl. No.: 08/842,558

[22] Filed: Apr. 15, 1997

Related U.S. Application Data

[63] Continuation-in-part of application No. 29/051,668, Mar. 15, 1996, Pat. No. Des. 382,861, and application No. 08/618,290, Mar. 15, 1996, abandoned.

[51] Int. Cl.$^7$ .............................. G06F 11/00; G06F 13/00; G06F 12/00
[52] U.S. Cl. ................................ 711/114; 714/6; 710/129; 711/170
[58] Field of Search ............................... 714/6, 7, 48, 57; 395/182.04, 182.05, 653, 185.01, 185.1, 281, 309, 311, 306; 713/100; 710/101, 129, 131, 126; 711/114, 112, 170

[56] References Cited

U.S. PATENT DOCUMENTS

| D. 382,861 | 8/1997 | Corrington et al. | D14/107 |
| D. 383,736 | 9/1997 | Corrintton et al. | D14/109 |

(List continued on next page.)

OTHER PUBLICATIONS

DataDock Storage Systems User's Guide of 34 pages; printed Jun. 1996.
DataDock 7000 User's Guide of 88 pages; printed Aug. 1996.
RAIDbank Pro Disk Arrays for IBM PC's and Compatibles User's Guide of 85 pages; printed Aug. 1995.

(List continued on next page.)

*Primary Examiner*—Eddie P. Chan
*Assistant Examiner*—Yamir Encarnacion
*Attorney, Agent, or Firm*—John G. Mesaros; George B. Almeida

[57] ABSTRACT

A user configurable RAID system designed to provide RAID functions as well as mass storage functions in a non-RAID mode. Flexibility is built into the system to allow the user to configure the SCSI bus to which removable drive modules are connected into one or more channels to define some of the drive modules in a RAID set and others as stand-alone drives which are independently operated or logically grouped and operated in a non-RAID mode. Removable internal SCSI bridges allow the SCSI bus to be configured into one or more channels. In the RAID mode, the system is configured to prevent a wrong drive from being removed from the system in the event of a drive failure. The system automatically unlatches only the failed drive. The RAID system includes an intelligent control unit ("ICU"), a RAID controller and a modem. The ICU allows the system administrator to access the RAID system Monitor Utility so that the status of the system may be monitored and its configuration changed. The ICU also monitors the failure status of the various components of the system. The ICU has a built-in pager feature that can be configured with the Monitor Utility to page the system administrator via the modem when a component or system failure is encountered. The RAID controller controls the functions of the RAID set as programmed and configured using the Monitor Utility. The Monitor Utility may be remotely accessed using a computer via the modem. Redundant removable power supply and fan units are provided to improve system integrity. The removable power supply and fan units are configured such when the unit is plugged into the system housing, the fan is first turned on and the power through the unit is allowed to stabilize before turning on the power supply to begin providing DC power to the components in the system. A set of manual release buttons are provided for manually unlatching the drive modules from the system housing. A locking mechanism is provided for simultaneously locking all the manual release buttons.

12 Claims, 21 Drawing Sheets

U.S. PATENT DOCUMENTS

| | | | |
|---|---|---|---|
| 4,230,917 | 10/1980 | Osika | 200/43.01 |
| 5,345,565 | 9/1994 | Jibbe et al. | 714/48 |
| 5,544,339 | 8/1996 | Baba | 711/114 |
| 5,586,250 | 12/1996 | Carbonneau et al. | 714/48 |
| 5,636,356 | 6/1997 | Kakuta et al. | 711/114 |
| 5,740,386 | 4/1998 | Miller et al. | 710/129 |
| 5,835,700 | 11/1998 | Carbonneau et al. | 714/48 |
| 5,875,063 | 2/1999 | Corrington et al. | 360/71 |

OTHER PUBLICATIONS

Druker, D. Press: Tricord Targets Olap Applications. [Online] news://comp.databases.olap, Mar. 30, 1995.

Tricord targets high–end SMP application serving market with new powerframe ES8000. PRNewswire, Mar. 28, 1995.

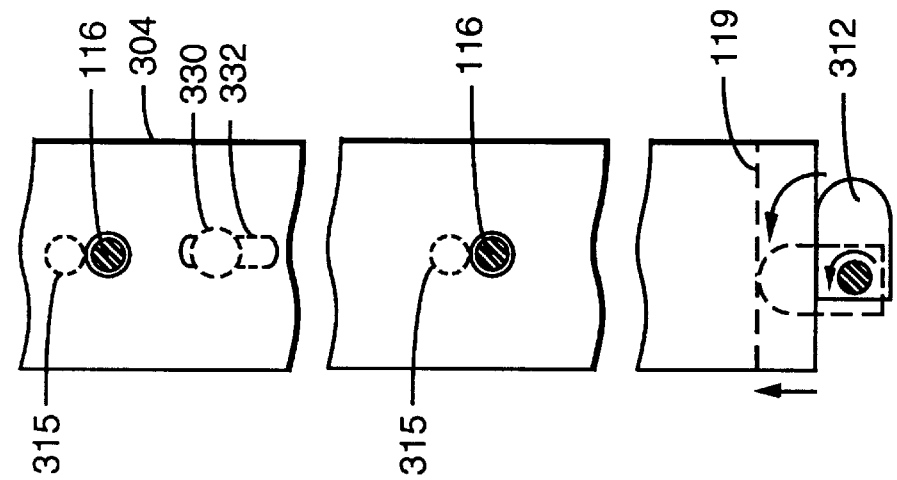
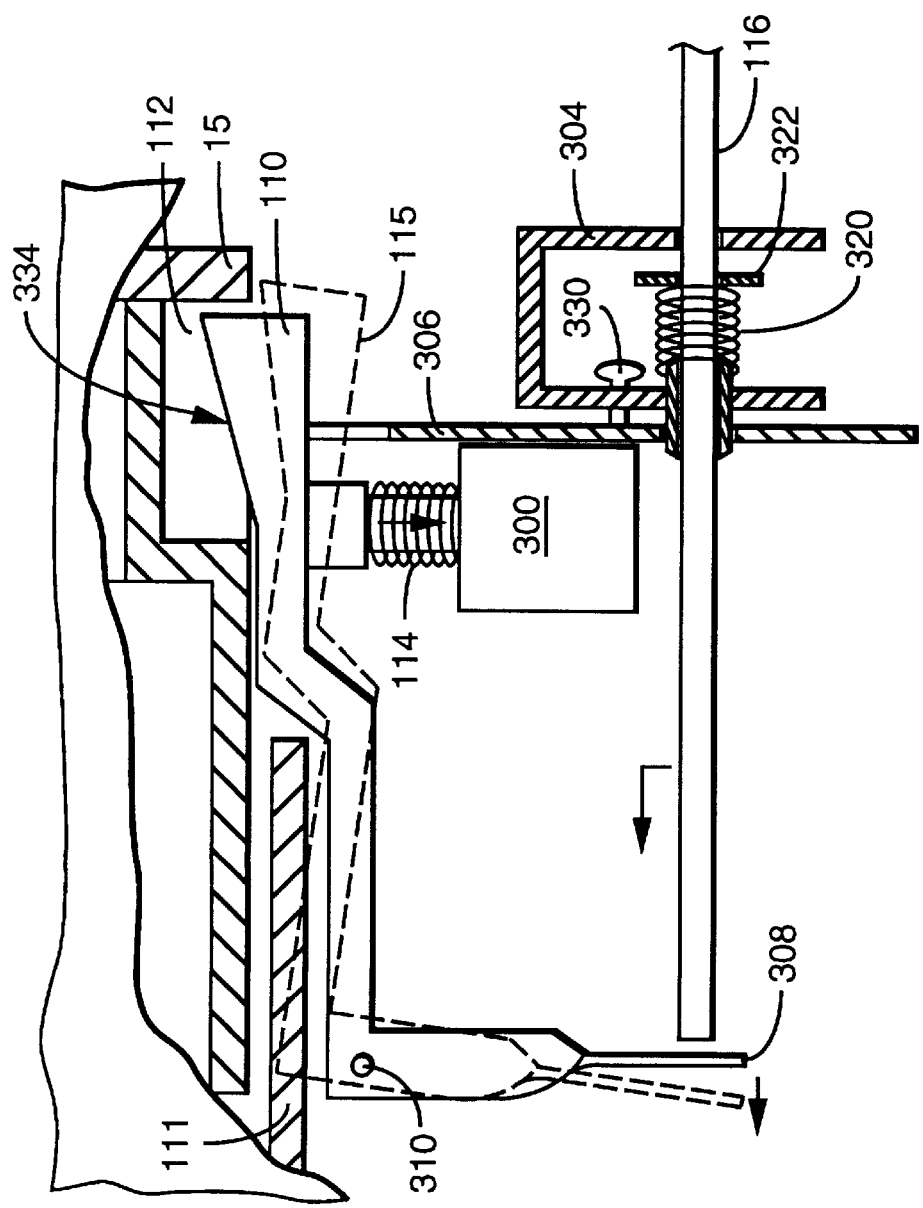
FIG. 8
FIG. 7

USER CONFIGURABLE RAID SYSTEM WITH MULTIPLE DATA BUS SEGMENTS AND REMOVABLE ELECTRICAL BRIDGES

This is a continuation-in-part application of U.S. Design patent application Ser. No. 29/051,668 filed Mar. 15, 1996, now U.S. Design Pat. No. D382,861 issued on Aug. 26, 1997, and U.S. patent application Ser. No. 08/618,290 filed Mar. 15, 1996 now abandoned.

BACKGROUND OF THE INVENTION

1. Field of the Invention

The present invention relates generally to the field of mass storage systems, and more particularly to high capacity systems having improved data security features and configuration options.

2. Description of the Related Art

With the explosion of electronic data in the information age, it is important that information processing systems be provided with fault tolerant data handling capabilities, including data redundancy to ensure that critical data is preserved in the event of a system failure. Mass storage devices such as hard drives, tape drives, and rewritable optical drives are used for providing backup of large amount of data. Hard drives are by far the most popular format for mass data storage, especially in relatively smaller information processing systems, e.g., local area networks.

So called RAID (which stands for Redundant Array of Independent Disks) systems have been designed to provide improved performance, increased capacity and increased level of data redundancy demanded by, for example, data processing, document imaging, data security and networking applications. Some RAID systems have one or more arrays of user removable data storage modules. For example, the RAIDbank Pro Disk Arrays system developed by the assignee of the present invention, MicroNet Technology, Inc. in California, includes drive bays for up to six removable disk drive modules (of the 'hot' swappable type) and two removable power modules in a system cabinet. Data transfer from the host computer system to the MicroNet RAID system is via a SCSI (which stands for Small Computer Systems Interface) port. A utility software installed at the host computer facilitates user configuration of the RAID functions programmed into the firmware in the RAID system. For example, the user can select the appropriate RAID level supported by the system, based on priorities including disk capacity, data redundancy and fault tolerance in the event a drive fails, and disk performance. The MicroNet RAIDbank Pro system may be configured so that data on a failed drive can be reconstructed by a process known as data rebuilding, which process may be invoked either automatically by the RAID system control without user intervention or manually by a system administrator. The MicroNet RAID system includes, in addition to disk failure detection, built in features such as system temperature detection, power failure detection, power surge protection, and alert alarms related thereto. A more detail description of the structure and functionality of the device may be found in the User Guide for the MicroNet RAIDbank Pro Disk Arrays system published by the assignee of the present invention, MicroNet Technology, Inc. (August 1995; Part No. MA4268), which is fully incorporated by reference herein.

There are drawbacks in the prior art RAID systems. For example, the prior art Systems do not prevent removal of a wrong drive by a user. A wrong drive may be removed inadvertently in the event of drive failure. This could have disastrous consequences. Losing a second drive in a redundant RAID system will cause all the data to be lost.

Further, the prior art failure detection alert functions provide only local alarms, which require the system administrator to be present at the system site in order to be able to determine the specific failure mode. Further, it is desirable to provide greater flexibility in the configuration of the storage arrays to facilitate more efficient use of the RAID system mass storage capability.

SUMMARY OF THE INVENTION

The present invention improves over the prior art RAID systems. The RAID system of the present invention is designed to provide RAID functions as well as mass storage functions in a non-RAID mode. Flexibility is built into the system to allow the user to configure the SCSI bus to which removable drive modules are connected into one or more channels to define some of the drive modules in a RAID mode (i.e., in a RAID set, which is recognized and addressed by the system as a single logical drive) and others as stand-alone drives which are independently operated or logically grouped and operated in a non-RAID mode. This is accomplished by providing removable internal SCSI bridges on a back plane which allows the SCSI bus to be split into two channels (i.e., a RAID channel and a non-RAID channel) or to operate as one channel.

In accordance with another aspect of the present invention, if a drive module fails in a RAID mode, the failed drive module is automatically spun down, turned off, and unlatched. The drive alarm flashes, the audible alarm sounds, and the SCSI ID display next to the failed drive flashes to indicate exactly which drive has failed. The only drive that can be removed from the system is the one that has failed. This prevents an operator from inadvertently removing the wrong drive in the event of a drive failure, which could have disastrous consequences.

The RAID system includes an ICU (intelligent control unit), a RAID controller and a modem unit. The ICU serves as the interface between the system administrator and the RAID system. The ICU allows the administrator to access the RAID system Monitor Utility so that the status of the system may be monitored and its configuration changed. The ICU also monitors the failure status of the various components of the system.

The ICU has a built-in pager feature that can be configured with the Monitor Utility to page the system administrator when a component or system failure is encountered. The modem unit is used in conjunction with the ICU, for facilitating the paging feature as well as allowing the system administrator to dial into the RAID system from a remote site to check system status and correct system errors or reconfigure the system to bypass failed components. The RAID controller controls the functions of the RAID set as programmed and configured using the Monitor Utility.

The Monitor Utility is a software utility program built into the RAID system. This utility can be used to monitor the operational status of the RAID system components, create and rebuild RAID sets, designate spare drives, and enter the RAID system's SCSI configuration settings. The utility may be remotely accessed using a desktop or notebook computer, by means of a data communication software, either via a serial cable or phone line through the modem.

Redundant removable power supply and fan units are provided to improve system integrity. The removable power supply and fan units are configured such when the unit is hot plugged into the system housing, the fan is first turned on and the AC power through the unit is allowed to stabilize before turning on the power supply to begin providing DC power to the components in the system.

A set of manual release buttons are provided for manually unlatching the drive modules from the system housing when power is off. Further, a locking mechanism is provided for simultaneously locking all the manual release buttons.

BRIEF DESCRIPTION OF THE DRAWINGS

FIG. 7 is a view taken along line 7—7 in FIG. 6.

FIG. 8 is a view taken along line 8—8 in FIG. 6.

NOTATION AND NOMENCLATURE

Figure 1:
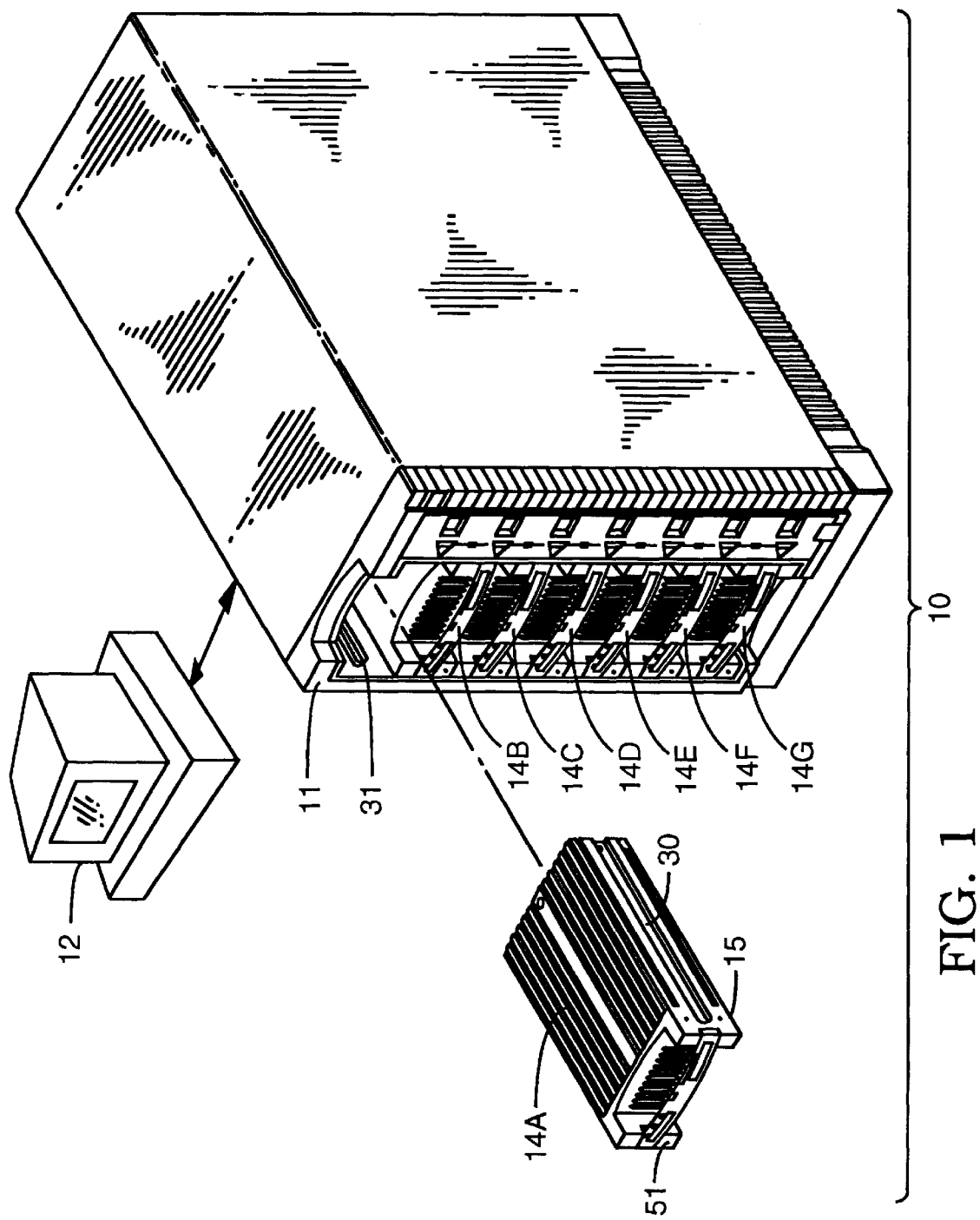
FIG. 1 is a schematic front perspective view of the RAID system of the present invention.

The detailed descriptions which follow are presented largely in terms of functional and symbolic representations of certain data processing devices and their operations and algorithms. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital processing devices, computers or other similar devices. In all cases, there should be borne in mind the distinction between the method of operating a computer and the method of computation itself. The present invention relates to method steps for operating a computer and/or processing electrical or other physical signals to generate other desired physical signals.

The present invention also relates to apparatus for performing these operations. This apparatus may be specially constructed for the required purposes, or it may comprise a general purpose processing device or computer selectively activated or reconfigured by program code stored therein. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform some or all the functions of the present invention include those manufactured by MicroNet Technology, Inc. in Irvine, Calif., as well as other manufacturers of computer systems.

DETAIL DESCRIPTION OF THE ILLUSTRATED EMBODIMENTS

The present description is of the best presently contemplated mode of carrying out the invention. This description is made for the purpose of illustrating the general principles of the invention and should not be taken in a limiting sense. The scope of the invention is best determined by reference to the appended claims.

In the following description, numerous specific details are set forth such as computer system configurations, storage system configurations, algorithms, etc. in order to provide a thorough understanding of the present invention. However, it will be apparent to one skilled in the art that the present invention may be practiced without these specific details. In other instances, well known circuits, structures and the like are not described in detail so as not to obscure the present invention unnecessarily.

The present invention may be embodied, for example, in a Model DATADOCK 7000 RAID system developed by MicroNet Technology, Inc. This system is publicly available at the time of filing of the present application for patent. The structure, operations and functions of this system is documented in the User's Guide (Part No. MA1049 Rev. B, August 1996), and is fully incorporated by reference herein.

FIG. 1 depicts the environment in which the RAID system 10 of the present invention is designed to operate. The RAID system 10 is coupled to the host computer system 12 which may be a server to which computing workstations are connected via a network (not shown). Specific control and data couplings between the RAID system 10 and the host computer system 12 will be described in greater details below. While FIG. 1 depicts a personal-computer based server system, it is understood that the host system 12 may be any type of data processing system requiring the mass data storage features of the RAID system 10.

It is instructive to provide an overview of some of the system features here prior to a more detailed description of the specific features and functions of various components within the system.

Figure 2:
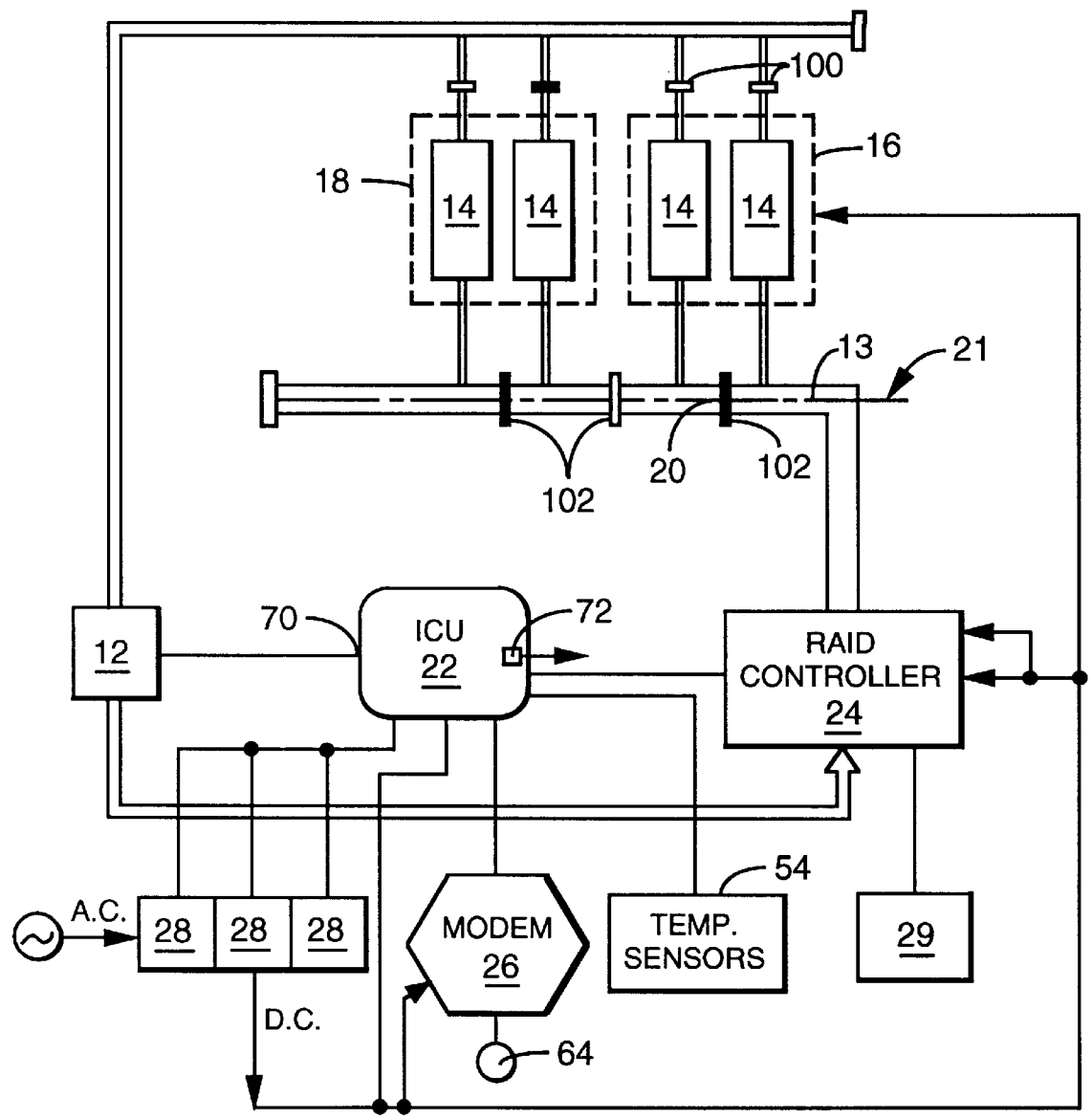
FIG. 2 is a schematic block diagram of the RAID system of the present invention.

FIG. 2 is a schematic block diagram of the major components of the RAID system 10. The RAID system 10 is designed to operate with removable and hot swappable drive modules 14 (allowing for replacement of failed drive modules without turning off system power thereby not interrupting system service). (In the illustrated embodiment, the RAID system 10 is designed to accommodate seven drive modules 14A to G.) The RAID system 10 is designed to provide RAID functions as well as mass storage functions in a non-RAID mode. Flexibility is built into the system to allow the user to configure the SCSI bus 13 into one or more channels coupling the drive modules 14 to define some of the drive modules in a RAID mode (i.e., in a RAID set 16, which is recognized and addressed by the system as a single logical drive) and others as stand-alone drives 18 which are independently operated or logically grouped and operated in a non-RAID mode. This is accomplished by providing removable internal SCSI bridges 20 on a back plane 21 which allows the SCSI bus 13 to be split into two channels (i.e, a RAID channel and a non-RAID channel) or to operate as one channel. As is known in the art, external termination blocks are provided for termination at the end of a SCSI bus, e.g. at an open external connector. A termination block is a device that acts as a filter or damper for data signal noise. It prevents data signals from bouncing off the open end of the SCSI bus and interfering with newly created data signals.

Figure 3:
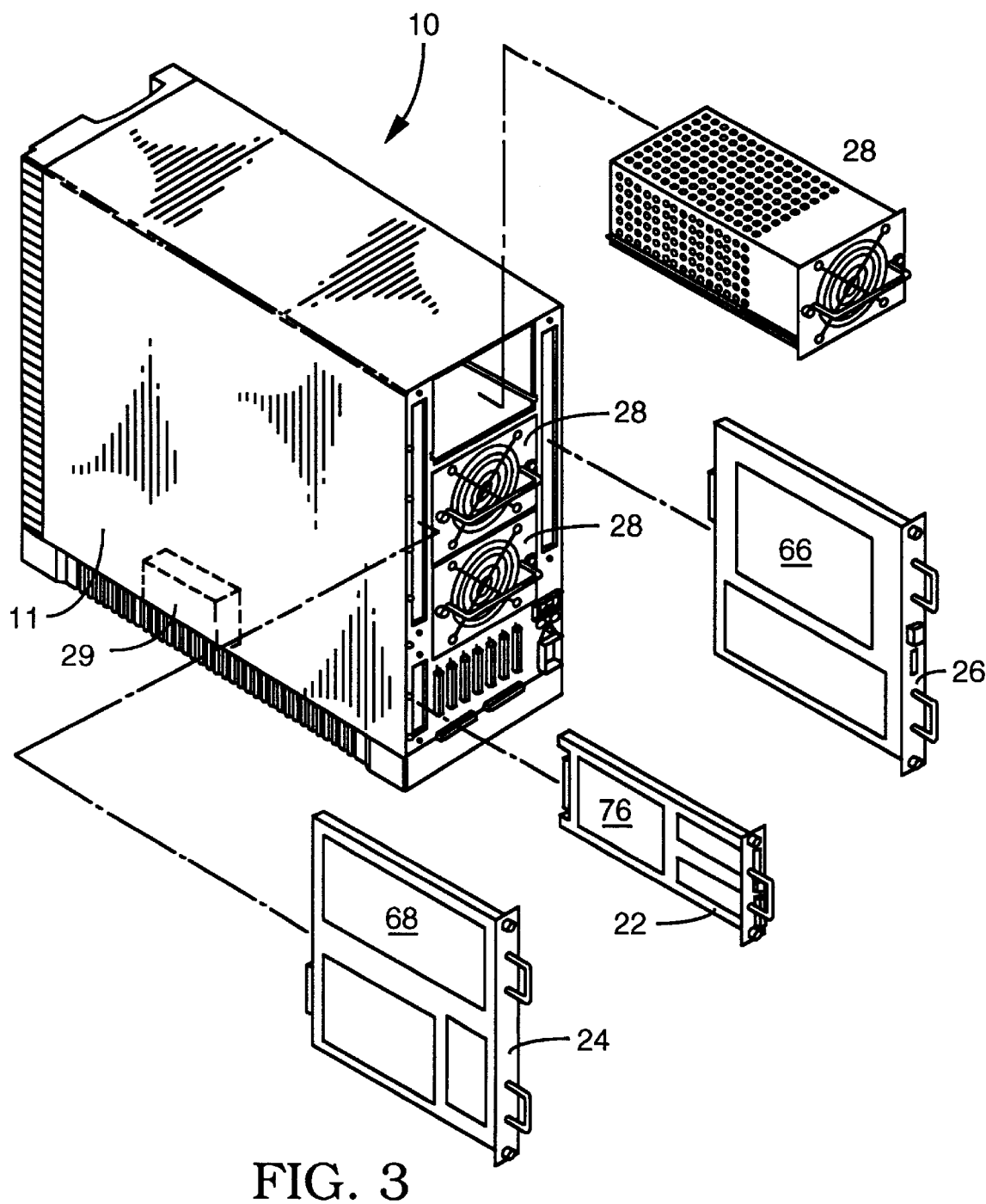
FIG. 3 is a rear perspective view of the RAID system of the present invention showing the removable components at the back of the system housing.
Figure 4:
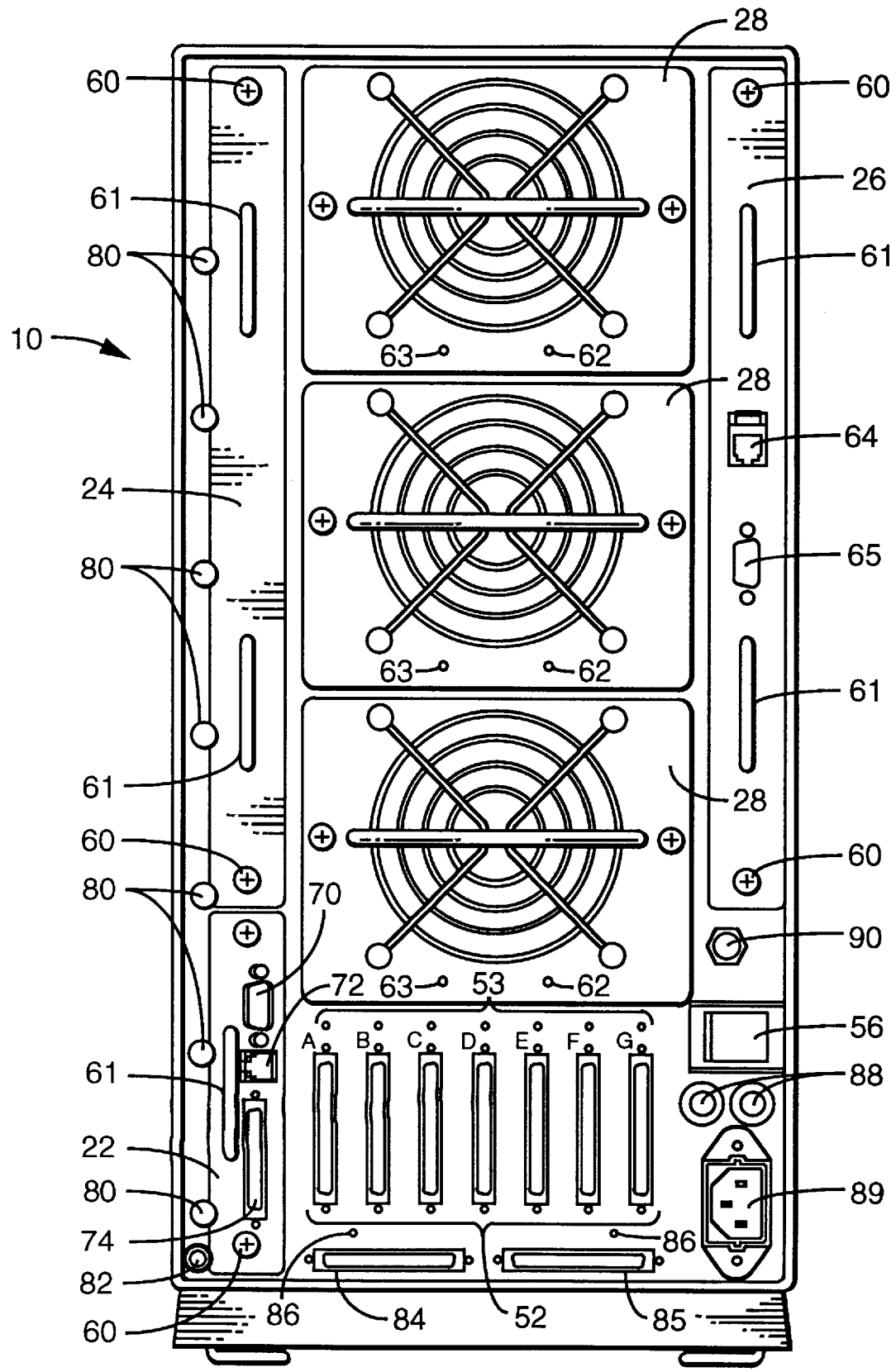
FIG. 4 is a rear plan view of the system housing.

Referring also to FIGS. 3 and 4, the RAID system 10 includes an ICU 22 (intelligent control unit), a RAID controller 24 and a modem unit 26. Basically, the ICU 22 is the interface between the system administrator and the RAID system 10. The ICU 22 allows the system administrator to access the RAID system Monitor Utility (which will be described later below) so that the status of the various system components may be monitored and its configuration changed. The ICU has a built-in pager feature that can be configured with the Monitor Utility to page the system administrator when a system failure is encountered. The modem unit 26 is used in conjunction with the ICU 22, for facilitating the paging feature as well as allowing the system administrator to dial into the RAID system 10 from a remote site to check system status and correct system errors or reconfigure the system to bypass failed components. The RAID controller 24 controls the functions of the RAID set as programmed and configured using the Monitor Utility. A rechargeable +6 V DC battery 29 is provided within the system housing 11 to supply backup power for the RAID controller 24 to maintain the DC power supply to the cache memories in the controller 24 in the event of an external power failure. Redundant power supply and fan units 28 (three units as shown in the figures) are provided to improve system integrity.

The Monitor Utility is a software utility program built into the RAID system 10. This utility can be used to monitor the operational status of the RAID system components, create and rebuild RAID sets, designate spare drives, and enter the RAID system's SCSI configuration settings. The utility may be remotely accessed using a desktop or notebook computer, by means of a data communication software, either via a serial cable or phone line through the modem 26. For the described embodiment herein, the communication software being used must support the VT-100 or VT 102 terminal emulation setting. Some operating system such as MICROSOFT WINDOWS have built-in communication software. The Monitor Utility is viewed by executing the data communication software.

The theory of RAID is generally well known in the art, and it alone does not form a part of the present invention. Therefore a detailed description of the RAID theory will not be provided here. Only a general overview of the RAID theory will be provided to facilitate discussion of the inventive features of the present invention. Generally, there are several RAID levels (0–5), and combination of two or more of these levels, which define the level of redundancy and the management of data storage in the RAID set. Data may be "striped" (RAID level 0), where data is broken up into smaller stripes and then each stripe is written to a different drive in the RAID set. When the stripes are saved to and read from different drives at the same time, performance is enhanced. Further, the data may be "shadowed" or "mirrored", i.e., duplicated on all the drives in the RAID set (RAID level 1). Thus, as long as there is one working drive in the RAID set, full access to the data are possible. As long as there is at least two working drives remaining in the array, the RAID level 1 will continue to function without putting data in jeopardy. Still further, at RAID level 3, parity on the stripes is calculated and separately stored in a drive. A combination of RAID levels 0 and 1 (RAID level 0+1) provides redundancy and performance. In the present invention, the RAID levels are set using the Monitor Utility.

In the RAID mode, when the host sends data to be written to a redundancy group (i.e., a RAID set), the controller 24 stores the data in its cache prior to writing the data to the disk drives. The cache is flushed to make room for additional write data only after the currently stored data has been written onto one or more of the drives in accordance with the RAID level set. In the event of a power failure, the data in cache will be retained under power from the backup battery 29 for a period of time (e.g. 48 hours) to allow adequate time for the system administrator to restore the power. When drive module failure occurs, the system automatically switches over from the defective drive module to a standby "hot spare" drive module that is already installed and operational and not currently configured for use in the system. The system automatically initiates a rebuild operation to reconstruct the failed drive's data onto the hot spare drive module. The rebuild operation by itself is also known in the art and does not form a part of the present invention. Specific structural and functional components and features are described below.

Removable Drive Modules

Referring back to FIG. 1, the housing of the RAID system 10 defines several bays (seven bays in the embodiment illustrated in FIG. 1) which are designed to receive the removable mass storage drive modules 14 (which may contain hard drives, tape drives, rewritable optical drives, etc.) For purpose of illustrating the invention, the RAID system will be described in connection with removable hard drives. The housing 15 of each module 14 is provided with a channel 30 on each side, which channels 30 cooperate with the guide tracks 31 provided in the housing 11 of the RAID system 10 when the modules 14 are inserted into the housing 11. At the rear of the module housing 13, an electrical connector is provided (not shown) which mates with a matching connector 32 on a printed circuit board located at the back plane 21 inside of the housing 11 (see also FIG. 5). The connector 32 provides the necessary electrical connection for supplying power to the hard drive in the module 14, transfer of data to and from the hard drive, and control signals for the operation of the hard drive. The external configuration of the drive module 14 may be similar to that described in the aforementioned U.S. Design Pat. No. D382, 861, which has been assigned to the assignee of the present invention and which is fully incorporated by reference herein. To avoid unnecessarily obscuring the present invention, details of the printed circuit board are not shown in the figures. It is sufficient to note at this time that the printed circuit board carries some of the electronics for the RAID system and the necessary circuits for interconnecting the drive modules 14 within the RAID system. The components of the printed circuit that are necessary for the understanding of the present invention will be described in greater detail below.

Once fully inserted in the bays, the modules 14 are powered up (the hard drive may be spinning at this state) and are latched in the bays of the housing 11 by an electromechanical latch under software control. To remove a module, it is first powered down or the hard drive is spun down before the latch can be released, either under software control or by a user actuating a switch 34 (FIG. 5) on the housing 11. This latch control feature has been described in detail in the copending patent application Ser. No. 08/618, 290, now abandoned and also the DataDock Storage Systems User's Guide published by the assignee of the present invention, MicroNet Technology, Inc. (June 1996; Part No. MA 1036, Rev. 3) which is fully incorporated by reference herein. A manual release mechanism is provided as a backup to the electronic control. The novel features of this manual release will be described in detail below.

Manual Release for Drive Modules

Figure 6:
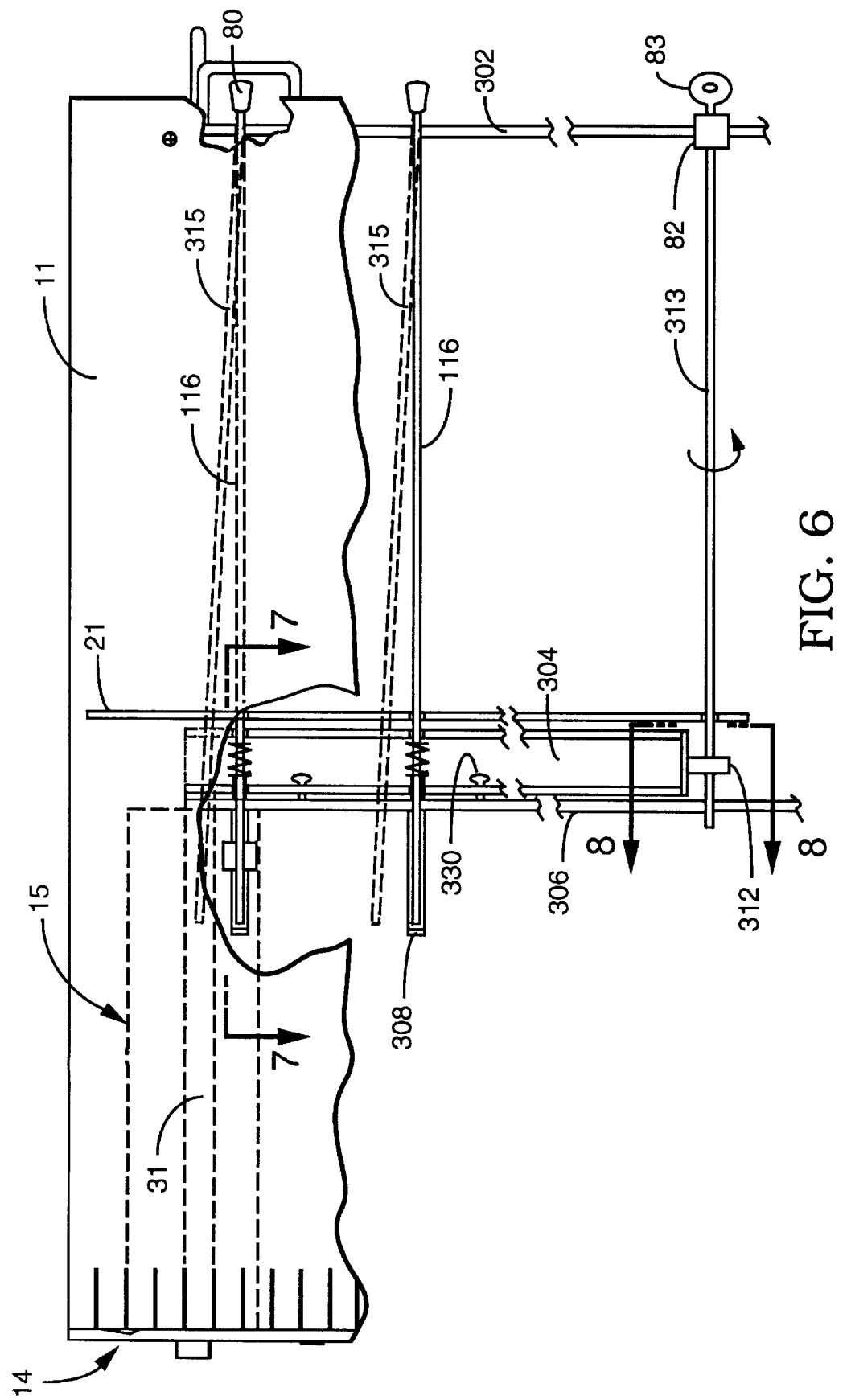
FIG. 6 is a side view of the housing partially broken away to show the manual release mechanism for the drive modules.

Referring to FIGS. 6 to 8, each drive module 14 is latched in place in a module bay 111 by a latch 110 against a notch 112 in the module housing 15 when the drive module 14 is fully inserted into its bay. The module housing 15 pushes against the cam surface 334 of the latch 110 as the module 14 is being inserted into the bay 111. The action of the spring 114 biases the latch 110 towards the module housing 15, and the latch 110 catches the notch 112 when the module 14 has been fully inserted into the bay. Under normal operations, the latch 110 is released from the drive module housing 11 by a solenoid 300. The solenoid 300 is coupled to the latch 110. In the RAID mode, the solenoid 300 may be actuated by the system software to bias against the spring 114 (to the position shown by dotted line 115) to release the module 14 after the module 14 had been powered down. In the non-RAID mode, the user initiates the power down sequence and latch release by activating the corresponding Drive Control button 34 for the drive module 14 to be released. However, in the event power is not available (for example in the event of a power failure) or that the solenoid 300 failed, a manual release button facilitates unlatching the drive module 14.

Referring also to FIG. 4, on the rear panel of the housing 11 is a row of manual release buttons 80, each for releasing a drive module 14. Each manual release button 80 is connected to a rod 116 at its end that extends through the rear panel 302. The other end 117 of the rod 116 extends through the back plane 21, a U-plate 304 and a fixed wall 306, to a lever 308 which is pivotally coupled at hinge 310 to the latch 110. One can push the release button 80, thereby pushing the lever 308, to pivot the latch 110 away from the module housing 15 to a position shown in dotted line 115 in FIG. 7. The latch 110 is disengaged from the module housing 15 to allow the latter to be pulled out of its bay by the user. A spring 320 supported by a stop 322 on the rod 116 biases the rod 116 and its push button 80 back to its original position. It is noted that when the manual release is being used, precaution should be exercised to wait for the drive module 14 to be powered down first.

A manual release lock 82 is used by the system administrator to disable all the module release buttons 80 (FIG. 6). The release lock 82 is coupled to all the rods 116 of the manual releases within the RAID system 10. The lock 82 is coupled to a rod 313 which extends through the vertical wall 306 at one end. A cam 312 interacts with the bottom of the U-plate 304, in a manner such that the lock 82 can be turned with a key 83 counterclockwise to raise the U-plate 304 vertically to the position shown by dotted line 119 (see FIG. 8). In this raised position of the U-plate 304, the ends 117 of all the rods 116 are guided away from the levers 308, to a position where the ends 117 of the rods 116 no longer engage the levers 318 when the manual release button 80 are pressed by a user (see dotted line position 315 of the rods 116). This is the "locked" position of the release lock as the manual release buttons are effectively disabled. Several guide pins 330 on the fixed wall 306 extend through vertical eyelets 332 (FIG. 8) for guiding the vertical movement of the U-plate.

Power Supply and Fan Units

Figure 25:
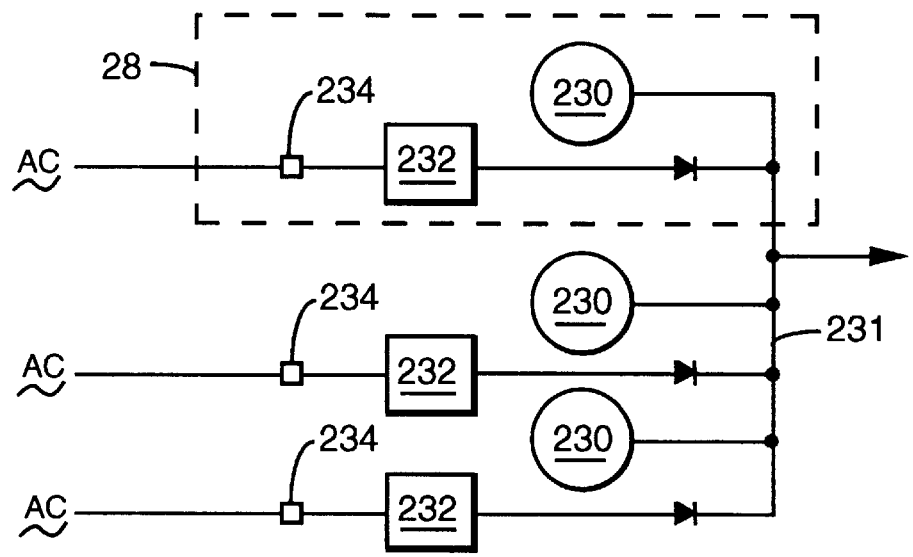
FIG. 25 is a schematic block diagram of the power supply and fan unit.

Referring to FIG. 25, each power supply and fan unit 28 comprises a fan 230 and AC-DC power supply 232. The units 28 are configured in parallel and share a common DC bus 231. Each unit 28 is designed to be hot pluggable. When the unit 28 is hot plugged into the rear of the system housing (i.e, with the system power on in the presence of at least one unit 28), it receives the external AC power fed through the power cord socket 89 (FIG. 4). At the same time, the fan 230 receives DC power from the common DC bus 231. The fan 230 turns on immediately upon connection to the power from the common DC bus 231. An optical relay 234 (Centron Part No. BR600240D25) is provided to delay turning on the AC-DC power supply 232 for two seconds, for example, to allow the AC power to stabilize. The optical relay detects the zero crossing of the AC current, and begins to turn on the power supply when the amplitude of the AC current is substantially zero. Further, the optical relay turns on the AC power gradually to avoid power spikes.

Front Panel

Figure 5:
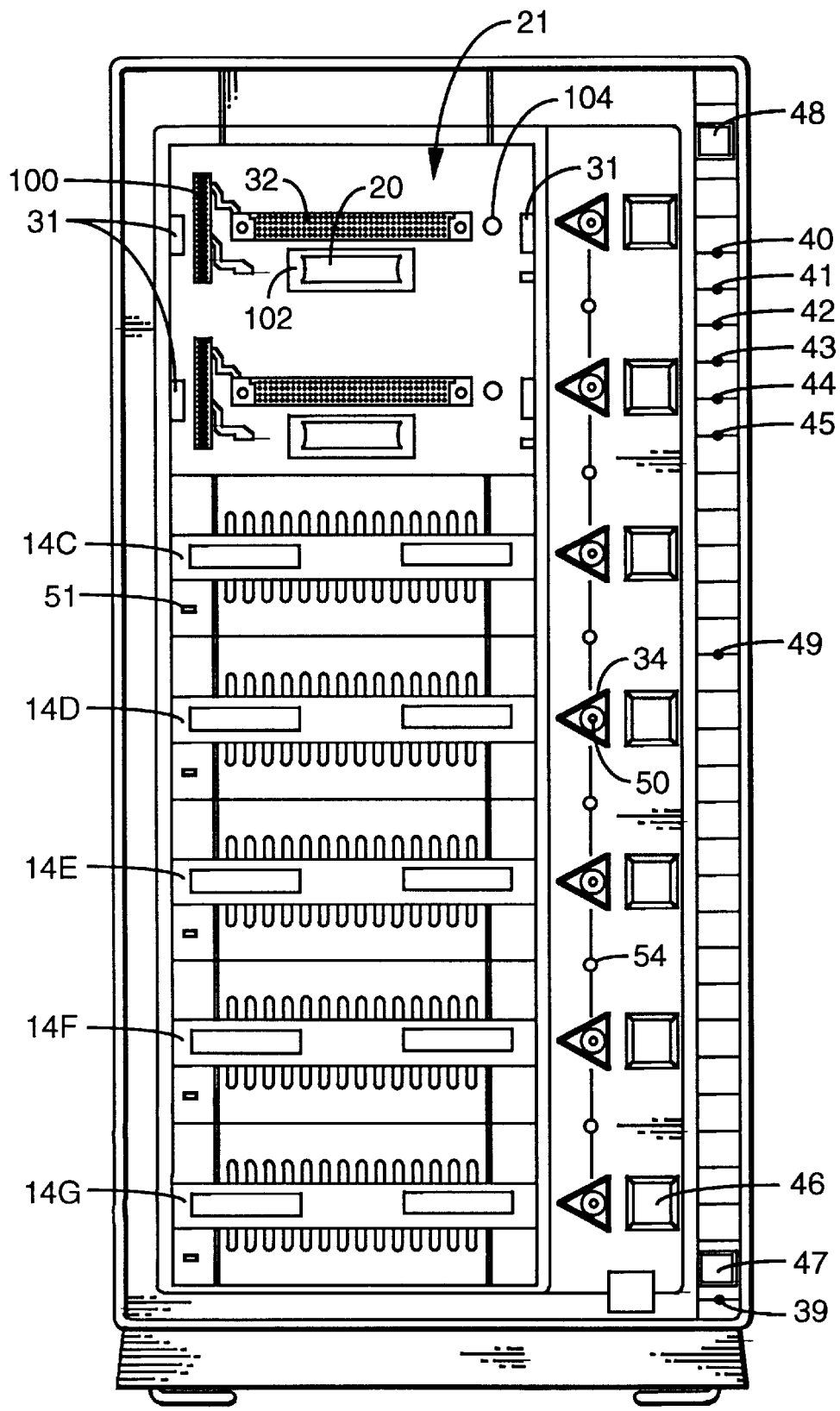
FIG. 5 is a front plan view of the system housing.

Referring to FIG. 5, the front panel of the RAID system housing contains various status indicators, specifically the following indicators:

Drive Alarm LED 40;

TEMP Alarm LED 41;

Power Supply/Fan Alarm LED 42;

ICU Alarm LED 43;

CNTRL Alarm LED 44;

CONFIGuration Alarm LED 45;

SCSI ID LEDs 46; and

Bus Configuration LEDs 54.

The front panel of the system housing 11 also contains the following buttons and sensor:

POWER button 47;

ALARM MUTE button 48;

SCSI ID Dimmer sensor 49; and

Drive Control buttons 34 including Drive LEDs 50.

On the front of each drive module 14 is an LED 51.

The functions of the indicators, buttons and sensor on the front panel will now be described.

The Drive Control buttons 34 are used to control and display the status of installed drive modules 14. When a button is off (button LED 50 off), the corresponding module 14 is not receiving power. When a button LED 50 is blinking, the corresponding module 14 is powering up or down. When a button LED 50 is on, the corresponding module 14 is powered up and ready for use.

The Bus Configuration LEDs 54 indicate which modules 14 have been daisy chained together on the same SCSI channel. This allows the administrator to determine the current configuration at a glance. When one of these LEDs 54 illuminates, it is an indication that the module above and the module below that LED are connected to the same channel. If an LED 54 is not illuminated, it indicates that the module above and the module below are not on the same channel.

SCSI ID LEDs 46 display the currently selected SCSI ID number for the adjacent module bay. The SCSI ID number for a selected module 14 can be set using the adjacent drive control button 34. To change SCSI ID, with the module 14 in the adjacent bay removed, the drive control button 34 is pressed to increment the ID. Any SCSI ID number from 0 to 15 may be selected. These settings are stored in NVRAM (non-volatile random access memory), so that the settings will not be lost in the event of a power failure.

The ALARM MUTE button 48 is used to disable the audible alarm of the RAID system. The audible alarm sounds when a component has failed or, in the case of temperature alarm, when normal system and/or component temperature has been exceeded. The failed component may be identified by visually inspecting the row of alarm LEDs 40 to 45 immediately below the ALARM MUTE button 48. This button 48 also displays which DRIVE ports 52 (see FIG. 4) are externally connected (i.e., in a non-RAID mode). By pressing and holding the ALARM MUTE button 48 while the RAID system is turned on, the SCSI ID LEDs 46 will switch from displaying SCSI IDs to indicators for which DRIVE ports 52 are active. If a drive port 52 is active, An "E" will be displayed in the LED to indicate that a cable should be connected to the drive's rear panel connector.

The DRIVE LED 50 will illuminate, an audible alarm will sound and the SCSI ID LED 46 will blink when a drive module 14 in a RAID mode has failed. The RAID system 10 will automatically spin down, power off and only unlatch the failed disk module. This prevents further damage to the module and allows the administrator to easily identify which module has failed. This is one of the more important aspects of the present invention. The present system effectively prevents a wrong drive from being removed in the event of a power failure. A more detailed discussion of this will follow under the section "Disk Failure Detection".

The TEMP Alarm LED 41 will illuminate and an audible alarm will sound when the temperature of the RAID system, an installed drive module, or the room has exceeded normal levels. In the illustrated embodiment, there are a total of nine temperature sensors 54 in the system. One sensor which is located at below the power switch 47 on the front panel (at 39, FIG. 5) monitors the ambient temperature outside the system housing. Another sensor is locate at the backplane 21 for monitoring the temperature within the housing. In each drive module, there is a temperature sensor which monitors any heat buildup within the drive modules. Two threshold levels are preset for alerting to an overheating condition in the modules. When the module temperature reaches the first level, the TEMP Alarm LED will blink and the audible alarm will sound. The problem should be corrected or the system should be shut down. If the temperature climbs to the second level, the RAID system will spin down and turn off all the drives to protect them from damage. The TEMP Alarm LED will then turn on continuously and stop blinking.

The Power Supply/Fan Alarm LED 42 will illuminate and an audible alarm will sound when one or more of the RAID system's three Power Supply/Fan units 28 has failed (as monitored by a voltage sensor in each power supply) or a fan speed drops below a predetermined threshold (as monitored by a speed sensor in each fan). The ICU Alarm LED 43 will illuminate and an audible alarm will sound when the ICU 22 has failed. If the ICU 22 fails, it will not interrupt the system. However, it will prevent the host computer from accessing the Monitor Utility to monitor and configure the RAID system. CNTRL Alarm LED 44 will illuminate and an audible alarm will sound when the RAID controller 24 has failed. The controller will need to be fixed or replaced before resuming normal RAID operation. The CONFIG Alarm LED 45 will illuminate and an audible alarm will sound when the RAID system has been improperly configured.

When the main power switch 56 on the rear of the RAID system is in the on position, the Power button 47 on the front panel can be used to turn the RAID system on or off. This button 47 is recessed and has a 5 second delay feature to prevent turning off the system inadvertently. The button must be held down for more than 5 seconds before the system is turned off.

SCSI ID LED dimmer sensor 49 is located in a recessed hole in the RAID system's front panel. It monitors ambient light in the room and adjusts the brightness of SCSI ID LEDs accordingly.

Rear Panel

Referring to FIG. 4, the rear panel of the RAID system 10 is illustrated. In the particular illustrated embodiment as mentioned before, the system has three power supply/fan units 28, a modem module 26, a RAID controller 24 and an ICU module 22. Each of these may be easily removable as a unit. Handles 61 are provided to facilitate the handling of the units. Each power supply/fan unit 28 has a Fan LED 62 and Power Supply LED 63 which come on when the unit is operating to provide cooling and power to the system components.

The modem module 26 includes a phone line jack 64, a serial port 65, and the necessary electronics 66 (FIG. 3) for enabling communications via the phone jack 64. The modem module 26 is used in conjunction with the ICU, for allowing the system administrator to dial into the RAID system from a remote site via a phone line through the phone jack 64 (see also FIG. 2). Once connected, the status of the system may be checked and the necessary system corrections may be performed through the RAID Monitor Utility.

The RAID controller 24 includes the necessary electronics 68 (FIG. 3) for controlling the functions of the RAID system, including cache memories for storing data to be written to the drive modules 14. The internal +6 V rechargeable battery 29 supplies power to the RAID controller 24 for approximately 48 hours after a power failure (or longer durations depending on the charge capacity of the battery). This protects data residing in the RAID controller's cache at the time of failure from being lost, so that the data can be safely transferred to non-volatile storage in the drives after the power failure. Once power is restored, the battery recharges.

A set of drive ports 52 (seven ports 52A to G in the illustrated embodiment) equalling in number to the number of module bays are provided on the back panel for directly connecting to the individual drive modules 14 in a non-RAID mode. Each drive port 52 has an accompanying LED 53, which indicates that the drive port is currently active when it is lit. (As will be explained below, a drive port 52 is activated by installing a SCSI bridge in one of the vertically orientated SCSI bridge receptacles on the internal back plane.)

Two controller ports 84 and 85 are provided on the back panel for control signals to and from the RAID system. Controller port LEDs 86 come on when the RAID controller is installed and indicate that two SCSI cables or a SCSI cable and a terminator must be connected (which will become more apparent when the RAID configuration is explained in greater detail below). Other components include a two-pole main power switch 56 which controls both AC main power and the connection of the backup battery 29 to the RAID controller 24, fuses 88 for the AC power and battery, and an AC powercord socket 89. Because the power switch 56 disconnects also the battery 29 when it disconnects the main AC power, it is important to remember to use the Monitor Utility to execute a shutdown routine prior to power off, so as to flush any data remaining in the cache memories of the RAID controller.

A mode switch 90 on the rear panel allows for setting the operating mode of the RAID system 10 in non-RAID applications, such as when the RAID system does not have a RAID controller and ICU installed or when a module bay has been designated as a non-RAID drive using the Monitor Utility. The following are descriptions for each mode setting:

Mode 1 (semiautomatic mode)—Module power down and release are initiated using the drive buttons 34 on the front panel. To remove the module, the operator presses the drive button and the power down sequence is initiated.

During this time, the button blinks to indicate that the power down sequence is in process. When it is completed, the LED goes off, the latch is released, and the module 14 can be removed.

Mode 2 (Automatic mode)—Module power down and release are automatically controlled by software.

Mode 3 (Service)—This mode is reserved for servicing by a technician only. The system control is disabled and all module bays always remain powered. The modules 14 are removed by turning off power to the system, waiting for the drives to spin down, and using the emergency module release buttons on the rear panel.

ICU Module

Referring to FIGS. 4 and 2, the ICU module 22 is the interface between the administrator and the RAID system. The ICU 22 allows the administrator to access the RAID system Monitor Utility so that the status of the system may be monitored and its configuration changed. The ICU are coupled to the components in the system, such as the drive modules 14, power and fan units, RAID controller, temperature sensors 54, etc. (see FIG. 2). It monitors the failure status of these components and sounds an alarm in the event of a component failure. The ICU has a built-in pager feature that can be configured with the Monitor Utility. If the ICU 22 encounters a failure, the ICU 22 can be configured to page the administrator via the modem 26. The ICU module 22 includes an ICU serial port 70 for accessing by a computer terminal the Monitor Utility of the RAID system, an inter-ICU jack 72 for coupling to another ICU in a slave RAID system (see FIG. 21), a SCSI connector 74 and the necessary electronics configured to perform the control function recited herein.

Figure 26:
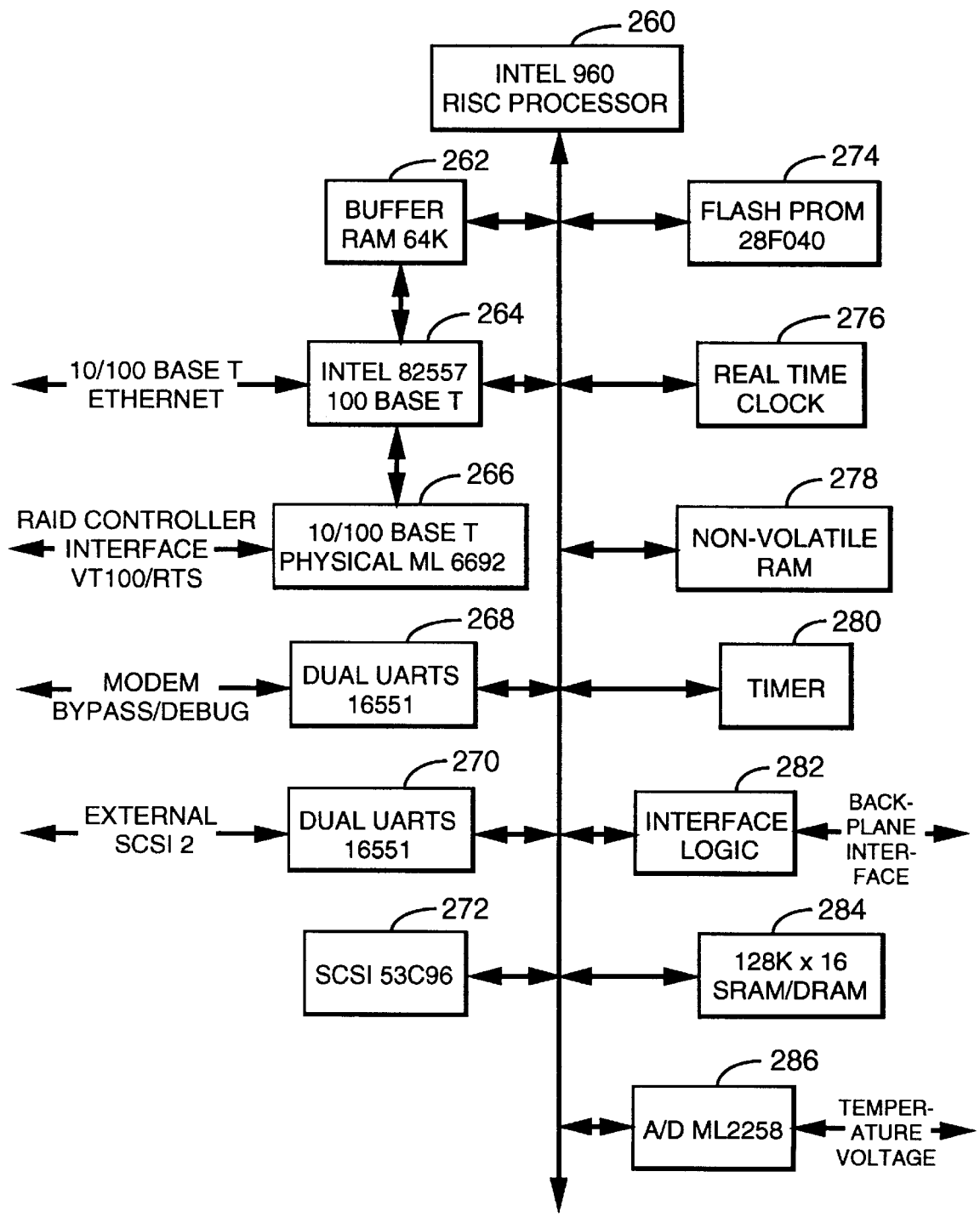
FIG. 26 is a schematic block diagram of the ICU module.

FIG. 26 is a schematic block diagram of the ICU 22. At the heart of the ICU 22 is an Intel 960 RISC processor. The ICU 22 also includes 64K buffer RAMs 262 (X32), and a flash PROM(2X28F040) 274 for storing the Monitor Utility program. Dual Uarts 16551 (268 and 270) provide an interface to the RAID controller and modem. Instead of communicating with the Monitor Utility via the modem, communications may optionally be made via a network interface. An Intel 82557 100 Base T 264 coupled to a 10/100 Base T (ML6692) 266 provide a 10/100 Base T ethernet interface to an external network. System failures may be reported via email, for example. A FAS216/53c96 provides a SCSI interface 272. A real time clock 276, non-volatile RAM 278 for storing system configuration information, and a timer 280 are also included in the ICU 22. The interface to the back plane 21 is via Interface Logic 282. System voltage and temperature monitoring is done via A/D (ML2258) at 286. Finally, 16×128K SRAM/DRAM 284 are provided in the ICU 22 for loading and executing Utility Monitor program.

Back Plane

Referring back to FIG. 5, the female SCSI connectors 32 at the rear of a drive module 14 mates with the male SCSI connector 32 when the module 14 is inserted into the RAID system. Each module is structured to be auto-terminating in relating to the SCSI bus if it is last on the SCSI bus. No additional termination is required on the SCSI bus.

Termination LEDs 104 are provided on the back plane for displaying which modules 14 have been auto-terminated. If a module has been terminated, the corresponding LED 104 will light. If the module is unterminated, the corresponding LED 104 will be unlit.

The back plane 21 (a printed circuit board) is illustrated. There are a set of vertical SCSI bridge receptacles 100 and a set of horizontal SCSI bridge receptacles 102. The SCSI bridges and receptacles allow the user to customize the SCSI configuration of the system. Jumpering a receptacle 100 or 102 with a SCSI bridge 20 completes a particular SCSI connection. In the particular embodiment shown, there are as many vertical SCSI receptacles 100 as the number of drive bays. (As will be more apparent later, fewer receptacles 100 may be provided on the backplane 21, but will result in less flexibility in the SCSI configuration.) There are one fewer horizontal receptacle 102 than the number of drive bays in the RAID system.

Figure 10:
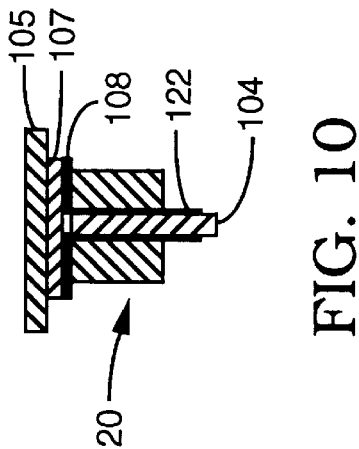
FIG. 10 is a sectional view taken alone line 10—10 in FIG. 9.
Figure 12:
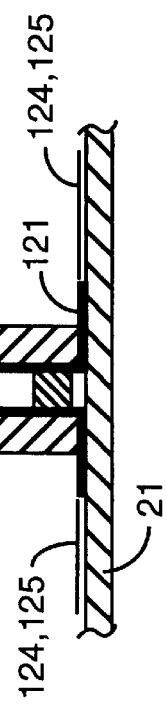
FIG. 12 is a sectional view taken along line 12—12 in FIG. 11.
Figure 9:
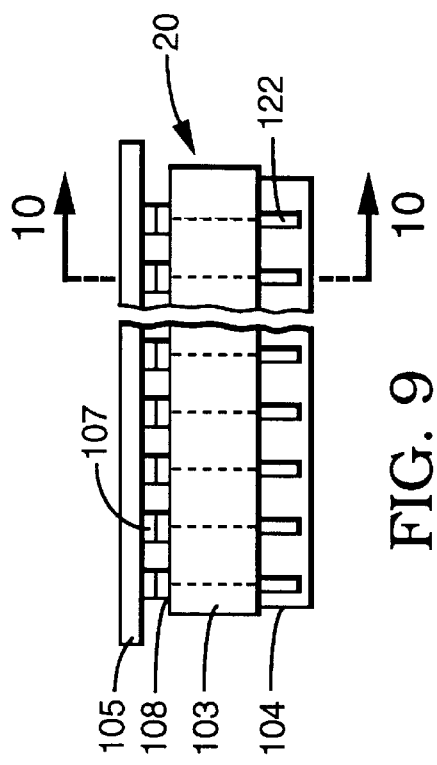
FIG. 9 is a side view of a SCSI bridge in accordance with the present invention.
Figure 11:
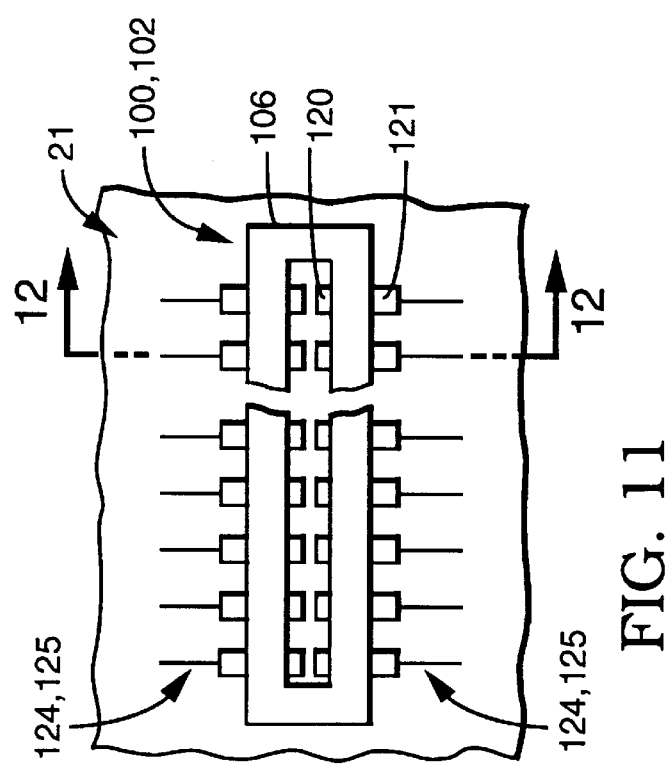
FIG. 11 is a top view of a SCSI bridge socket on the back plane of the system.

The structure of the SCSI bridge 20 is illustrated in FIGS. 9 and 10. It includes a body 103 and an extended strip 104 having electrical conductive contacts 122 defined in two rows of thirty-four thereon (there is one extra lead on one of the rows which is not used). The bridge 20 may be the surface-mount, vertical headers available from Berg Electronics (Part No. 91911-31169). A narrow strip of printed circuit board 105 is used to short the contacts on one side of the extended strip 104 to the corresponding contacts on the other side of the extended strip 104. Specifically, conductive shunts 107 are defined on the strip of printed circuit board, each for bridging the surface mount leads 108 of a pair of the contacts 122 on either side of the extended strip 104. The bridge 20 is designed to be plugged into a matching socket 106 (the surface-mount vertical receptacle available from Berg Electronics (Part No. 91931-31169)) having two rows of thirty-four contacts 120 (see FIGS. 11 and 12) (one row has an extra contact which is not used). The surface mount leads 121 of the contacts 120 are connected to the leads 124 or 125 on the backplane 21. The receptacles 100 and 102 have the same type of socket. The contacts 122 on the bridge 20 essentially form shunts across the corresponding leads 124 or 125 on the back plane 21 after the bridge 20 is plugged into the socket 106.

Figure 14:
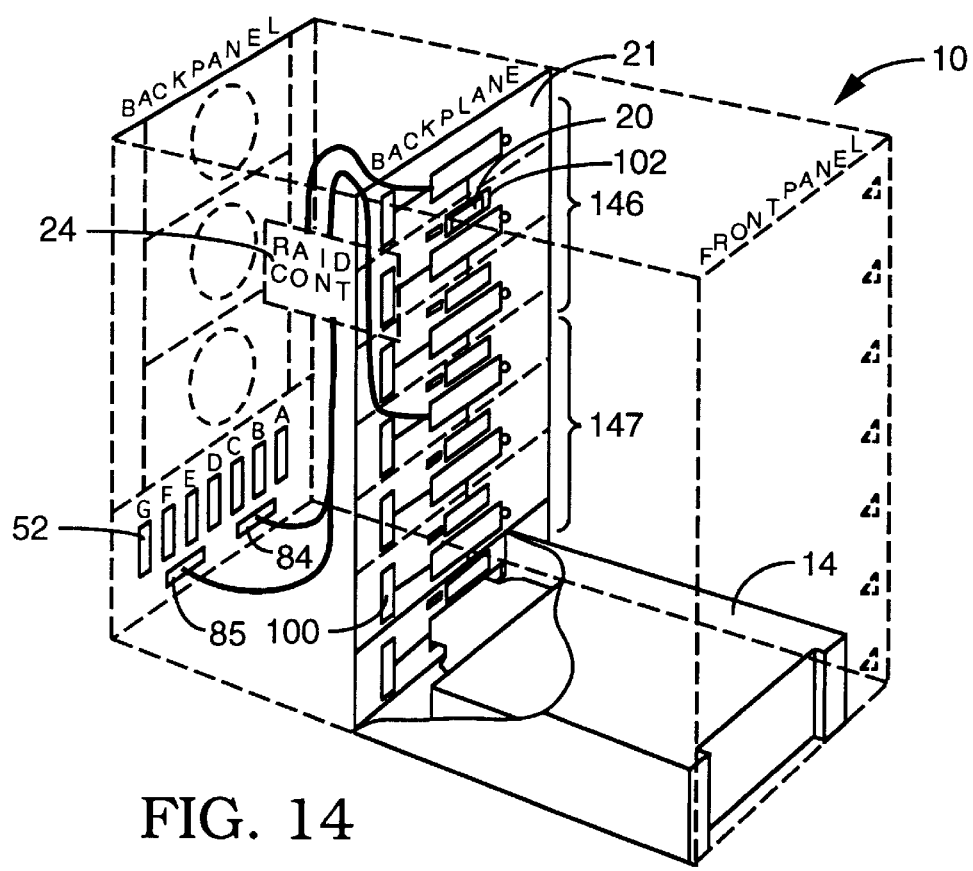
FIG. 14 is a schematic view illustrating the connections between the back plane and the controller ports in a two-channel RAID configuration.
Figure 15:
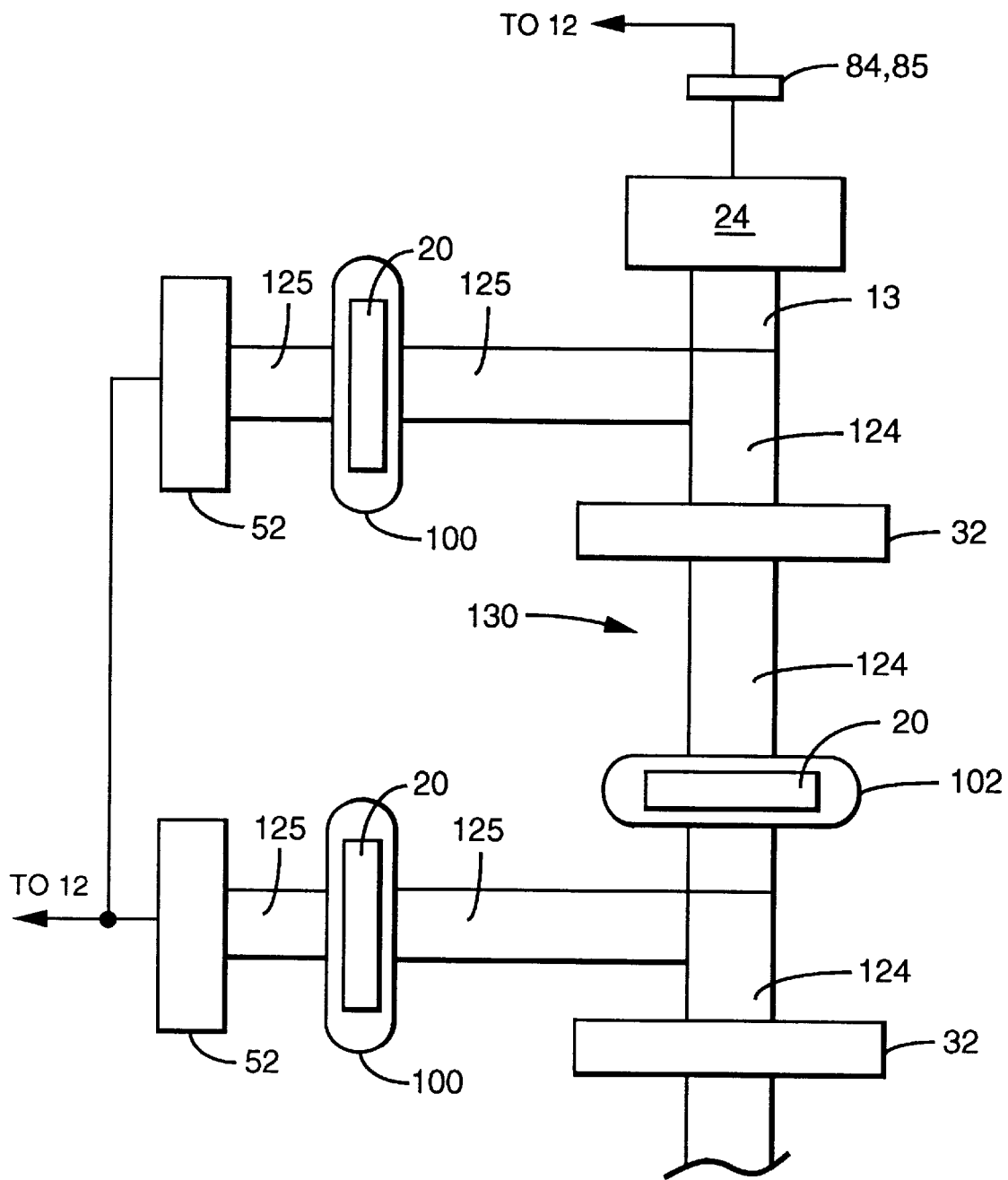
FIG. 15 is a schematic diagram illustrating the bus connection on the back plane.
Figure 16:
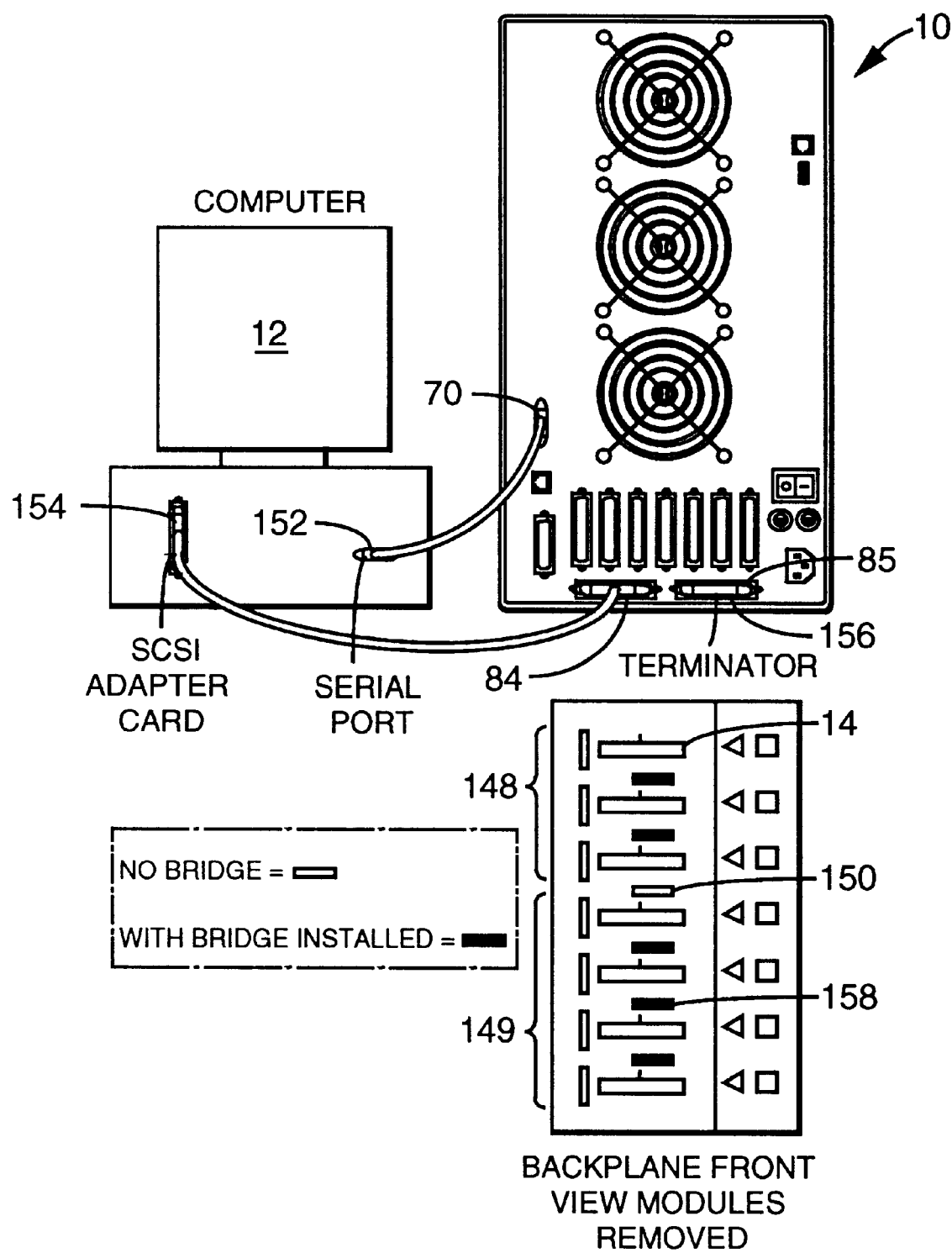
FIGS. 16–24 illustrates the various SCSI cabling and configurations of the system in either RAID mode, non-RAID mode or both.

FIG. 15 is a schematic diagram of the SCSI bus leads on the back plane 21. The leads 124 form a SCSI bus 130 along which the connectors 32 and bridge socket 102 are coupled. Without a bridge 20 plugged in the socket 102, the continuity of the bus is broken at the socket 102. Accordingly, several connectors 32 may be grouped into one channel of the bus 130 by placing the bridges 20 into the sockets 102 in between those connectors 32 in a group. For example, as shown in FIGS. 14, 16 the top three connectors (for drive modules 14A to C) are grouped into one bus channel, and the bottom four connectors (for drive modules 14 D to G) are grouped into another bus channel.

Referring also to FIG. 14, the horizontal SCSI bridge receptacles 102 connect the drive modules 14A to C to one another on the same SCSI bus or bus channel. Placing a SCSI bridge 20 into one of these receptacles connects the module above and below to the same bus or channel. As shown in FIG. 14, the drives 14A through C are in one channel 146 and drives 14D through G are in another channel 147. Both channels are separately controlled by the RAID controller 24. The RAID controller has two controller ports 84 and 85 for external access by the computer 12.

Figure 13:
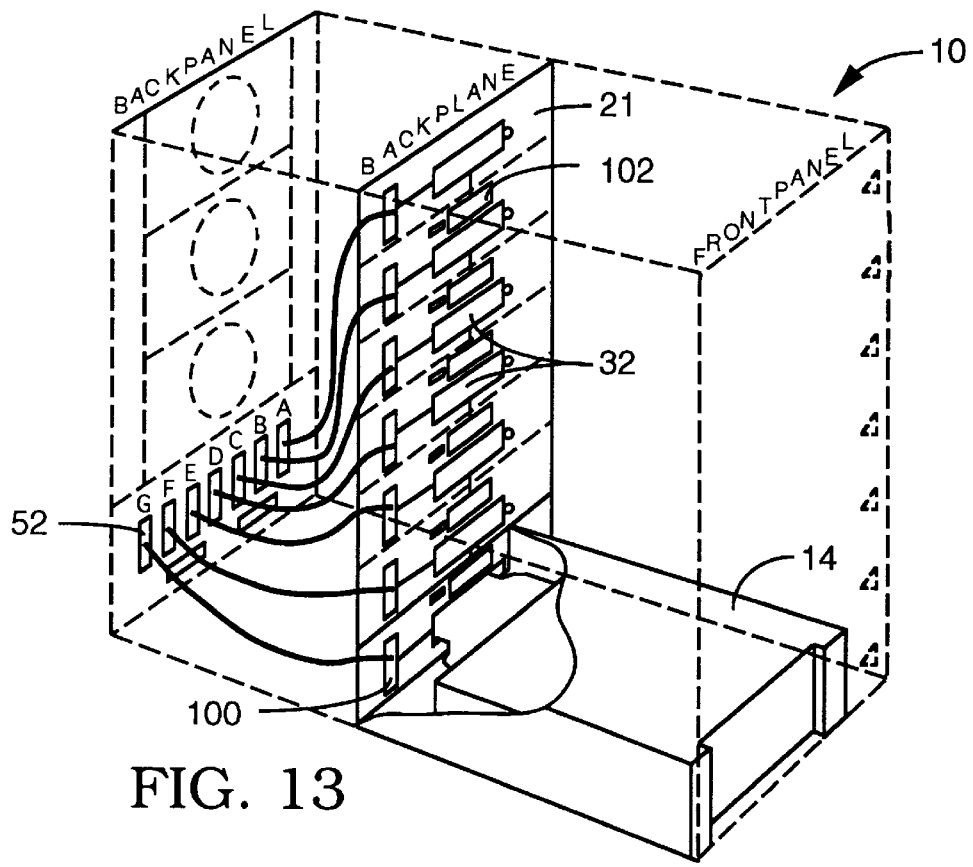
FIG. 13 is a schematic view illustrating the connections between the back plane and the drive ports in a non-RAID configuration.

The vertical bridge sockets 100 are similar in structure to the horizontal sockets 102, and they cooperate with SCSI bridges 20 to close or open the leads to the socket 100. These connections are for activating the drive ports 52. Referring also to FIG. 13, the vertical SCSI bridge receptacles 100 connect the connectors 32 of each drive module 14 to its respective drive port 52. When a SCSI bridge plug 20 is placed in one of these receptacles 100, the connection between the drive module 14 and its respective drive port 52 becomes active. When a drive port 52 is made active with a bridge 20, another RAID system, computer, or other SCSI device may be connected to that port 52 to directly access the drive module 14 connected thereto. A drive port 52 should only be activated when SCSI cables will be connected to it. If SCSI cables are not being connected to a drive port 52, the SCSI bridge for that port should be removed for that port to avoid on illegal SCSI configuration which can cause SCSI related problems.

Cabling and Configuring the SCSI Bus

This procedure involves configuring the RAID system's internal SCSI bridges 20 and connecting SCSI devices to the RAID system using SCSI cables. The SCSI configuration desired will determine how and where to install cables. Referring back to FIGS. 2 and 15, SCSI bridges 20 allow for the freedom to decide which drives 14 to place on the same bus or bus channel to form a RAID set 16 and which drive ports 52 to make active for direct connection to the corresponding drive modules 14 (e.g., for a non-RAID application).

With the foregoing discussions in mind, the various ways the RAID system may be configured to function either strictly in a RAID mode or in a non-RAID mode, or a combination of both are now described with reference to FIGS. 16 to 24. (The bottom half of each figure is a back plane front view with modules removed from the system housing.)

FIG. 16 shows the configuration of a single RAID set in which the drive modules 14 are separately controlled by two RAID channels 148 (drives 14A–C) and 149 (drives 14D–G). In this configuration, all but the horizontal SCSI bridge at bridge socket 150 are installed, and all the vertical bridges are omitted. Therefore, the drive port LEDs 53 are all off, and both controller port LEDs 86 are on (not shown in the figure). The serial port 152 of the computer 12 is connected to the ICU serial port 70. The controller port 84 of the RAID system 10 is connected to the SCSI adapter card 154 on the computer. The computer 12 may be used to execute the Utility Monitor via the serial port 70. Data transfers to the RAID system 10 are via the controller port 84. As mentioned before, the SCSI bus must be terminated at the open end. Since the RAID system in FIG. 16 is the last device connected to the SCSI adapter 154, it is at an end of the SCSI bus in the overall system and should therefore be terminated. It can be terminated by placing a terminator plug 156 on the controller port 85 that is open.

It is noted that one or more of the horizontal SCSI bridges may be omitted if fewer drive modules 14 are required to make up the RAID channel 149, for example. In which case, the SCSI bridge after the last active RAID drive module 14 in the channel 149 should be omitted. For example, using the example in FIG. 16, the SCSI bridge 158 should be removed after the drive module 14E in the case of a RAID channel 149 comprising two drive modules 14D and 14E. As mentioned before, it is noted that the drive bays are self terminating, so no terminator plug is required to terminate the RAID channels 148 and 149 on the bus.

Figure 17:
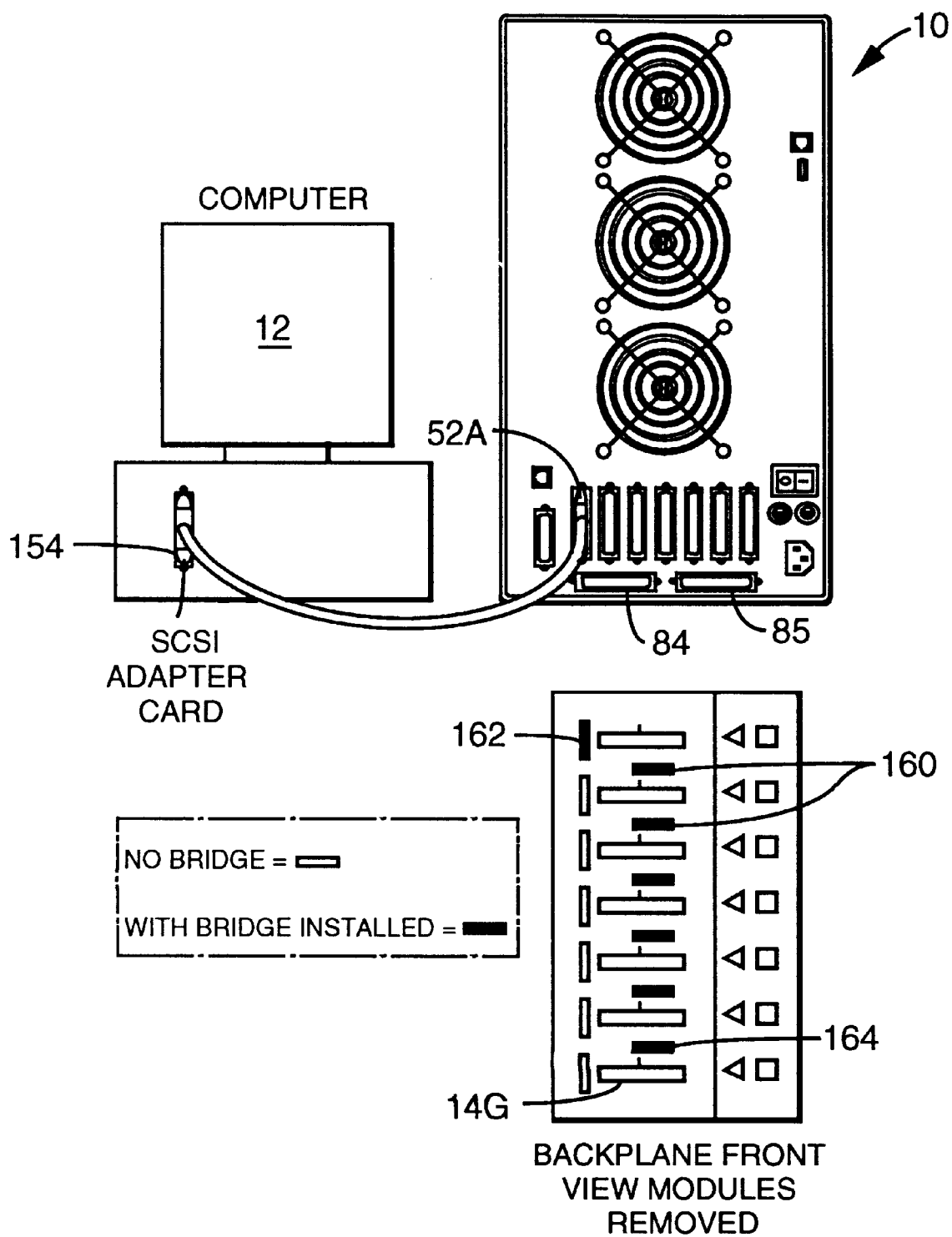

FIG. 17 shows the configuration of the RAID system 10 which effectively operates the RAID system as a single channel non-RAID mass storage device. In this configuration, all the horizontal SCSI bridges 160 are in place, and only the vertical SCSI bridge 162 for the first drive 14A is installed on the back plane. Accordingly, only the drive port LED 53 corresponding to the drive port 52 for the first drive 14A would be lit, thus indicating that the first drive port is active. The seven drives 14A–G together form a logical storage unit accessible via the first drive port 52A. It is noted that no terminator is required for either of the controller port 84 or 85, since the controller port is not part of the SCSI bus in the configuration shown in FIG. 17. The number of drives within the mass storage channel may be defined to be less than seven by disconnecting one or more drives at the lower end of the bus by removing one or more of the horizontal SCSI bridges (e.g., bridge 164 may be removed to functionally omit drive 14G from the storage channel.

Figure 18:
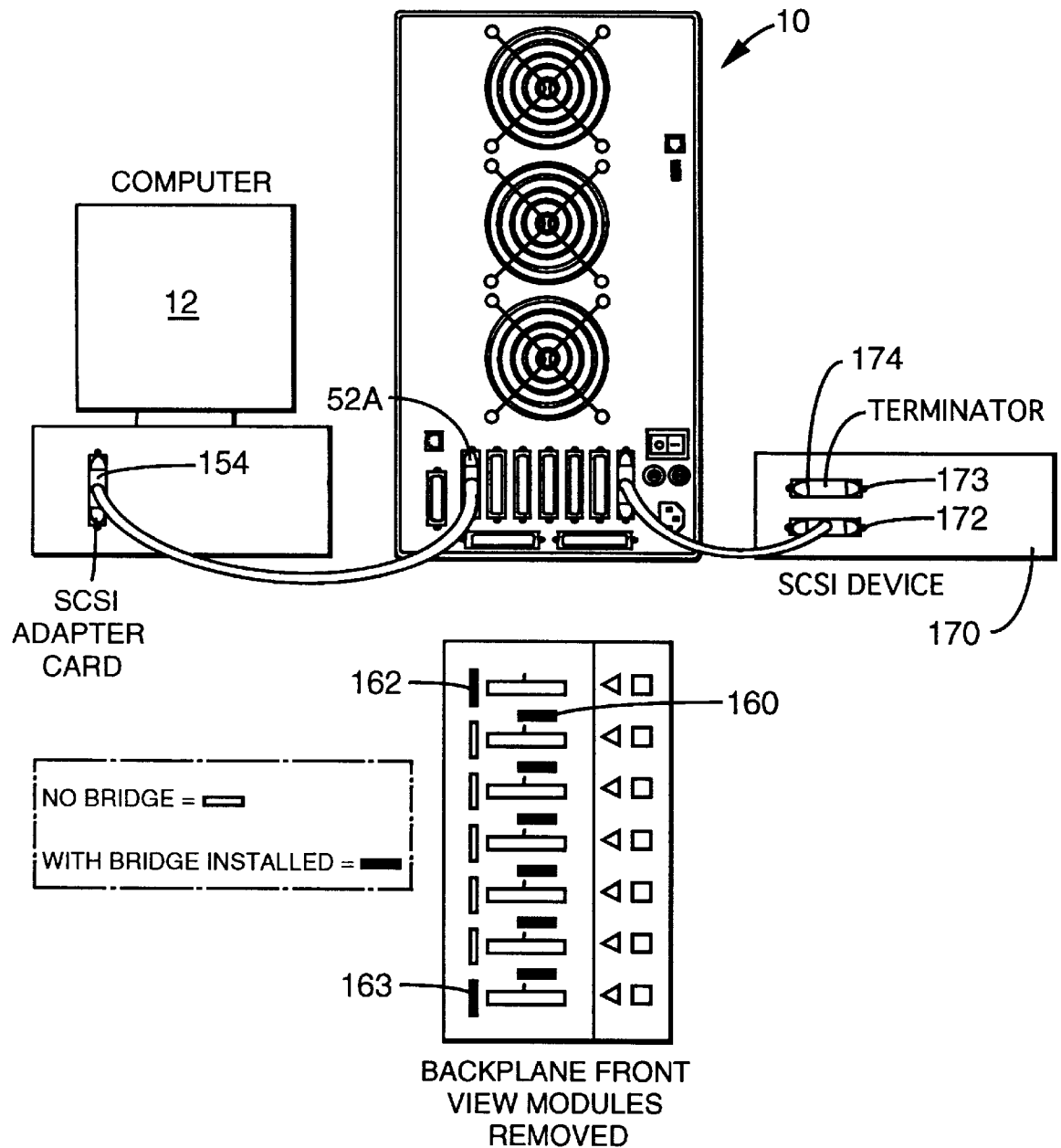

FIG. 18 shows the configuration of the system of FIG. 17 above with an additional SCSI device 170. In this configuration, the vertical SCSI bridge 163 is also installed on the back plane 21 to also activate the drive port 52G (the corresponding drive port LED 53 would be lit). A cable connects the drive port 52G to the SCSI connector 172 on the SCSI device 170. The additional SCSI connector 173 on the SCSI device 170 should be terminated with an appropriate terminator 174.

Figure 19:
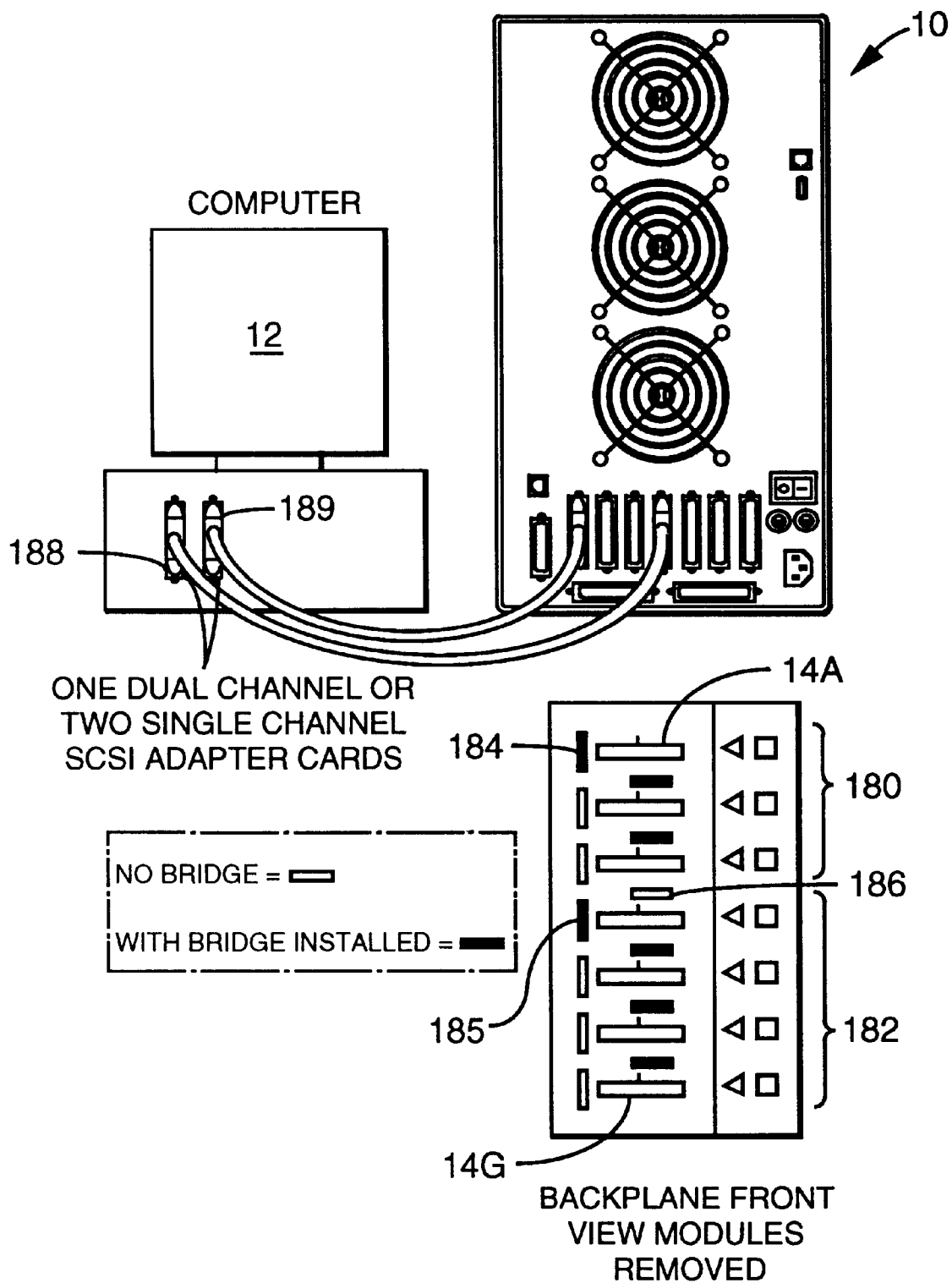

FIG. 19 shows the configuration which effectively turns the RAID system 10 into a dual channel non-RAID storage unit. In this embodiment, there are two groups 180 and 182 of drives, namely drives 14A through C and drives 14D through G, respectively. Vertical SCSI bridges 184 and 185 are installed in receptacles corresponding to the drive 14A and drive 14D (the corresponding drive port LEDs 53 would be lit). All but the third horizontal SCSI bridge at receptacle 186 are in place. Effectively, two storage channels are formed. By connecting the drive port 52A and drive port 52D to the computer SCSI adapter cards 188 and 189 (may be a dual channel SCSI adapter card or two single channel SCSI adapter cards), the group of drives 14A–C and 14D–E may be independently accessed for data storage and retrieval. The relative number of drives in each storage channel may be varied by appropriate configuration with SCSI bridges to group the desired number of drives in each group as desired.

Figure 20:
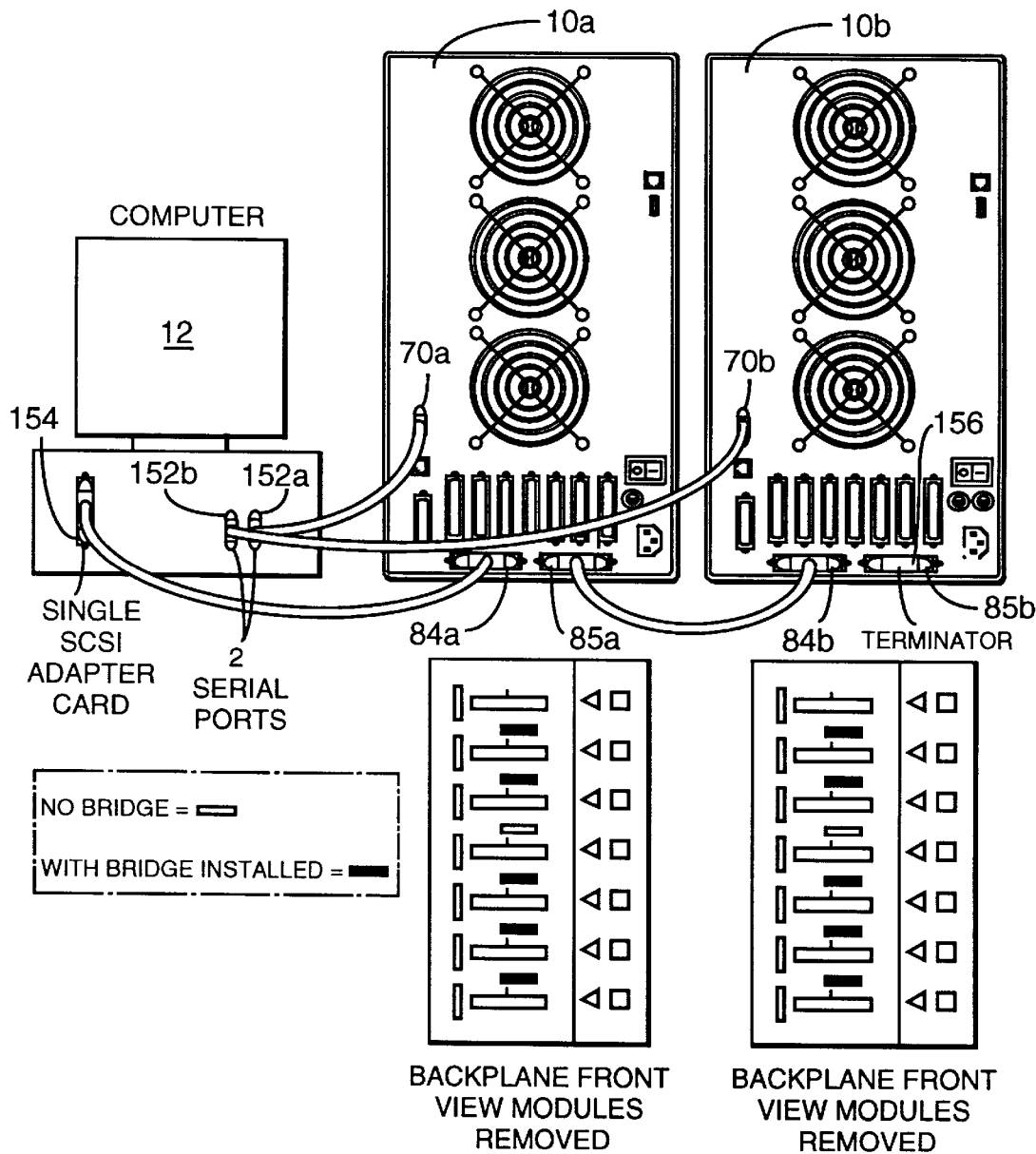

FIG. 20 shows the configuration of coupling two RAID systems 10a and 10b. The SCSI bridges are installed in each system in a similar manner as the system illustrated in FIG. 16. The SCSI adapter card 154 of the computer 12 is connected to the controller port 84a of the first RAID system 10a. The two RAID systems 10a and 10b are coupled by a cable connecting the controller ports 85a and 84b. A terminator 156 terminates the end of the SCSI bus at port 85b. Two serial ports 152a and 152b on the computer 12 are respectively connected to the serial ports 70a and 70b of the ICUs in the RAID systems. According to this configuration, each system 10a and 10b functions as a dual channel RAID system in a single logical RAID set.

Figure 21:
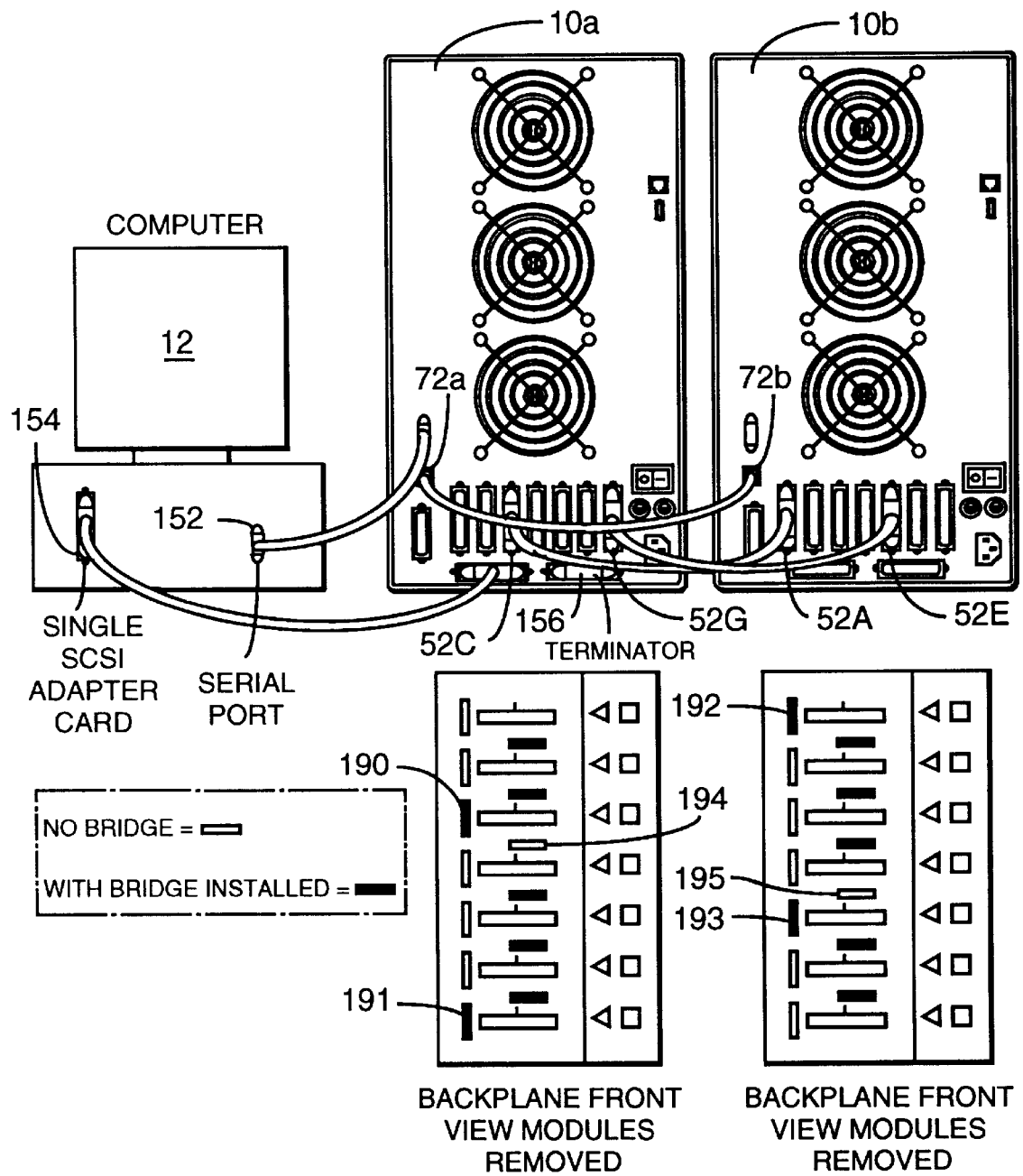

FIG. 21 shows the configuration of two RAID systems 10a and 10b which are connected in a manner in which one system functions as the RAID controller for the drives of both systems. The ICUs of the two RAID systems in FIG. 21 are connected via the inter-ICU jacks 72a and 72b. Vertical SCSI bridges 190, 191, 192 and 193 are installed in the two RAID systems as shown in FIG. 21. The horizontal SCSI bridge for socket 194 is omitted in the first RAID system 10a and the SCSI bridge for the horizontal socket 195 is omitted in the second RAID system 10b. A cable connects the drive port 52C on the first RAID system to the drive port 52A on the second RAID system 10b. Another cable connects the drive port 52G on the first RAID system 10a to the drive port 52E on the second RAID system 10b. A terminator 156 terminates the controller port 85a on the first RAID system 10a. No terminator is required for the controller port 85b on the second RAID system 10b since the drives in the second RAID system are all under RAID control of the first system 10a. Effectively, the drives 14A–C in the first system 10a and the drives 14A–D in the second system 10b form a first channel of the RAID set, and the drives 14D–G in the first system 10a and the drives 14E–G in the second system 10b form a second channel of the RAID set. The RAID control of the drives in the second system 10b is performed by the RAID controller in the first system. Since the ICU in the second system 10b is coupled to the ICU in the first system 10a via the inter-ICU jacks 72a and 72b, the system configuration via the Utility Monitor may be performed through a single serial port 152 of the computer 12. The ICU in the second system 10b monitors the system environment of the second system 10b.

Figure 22:
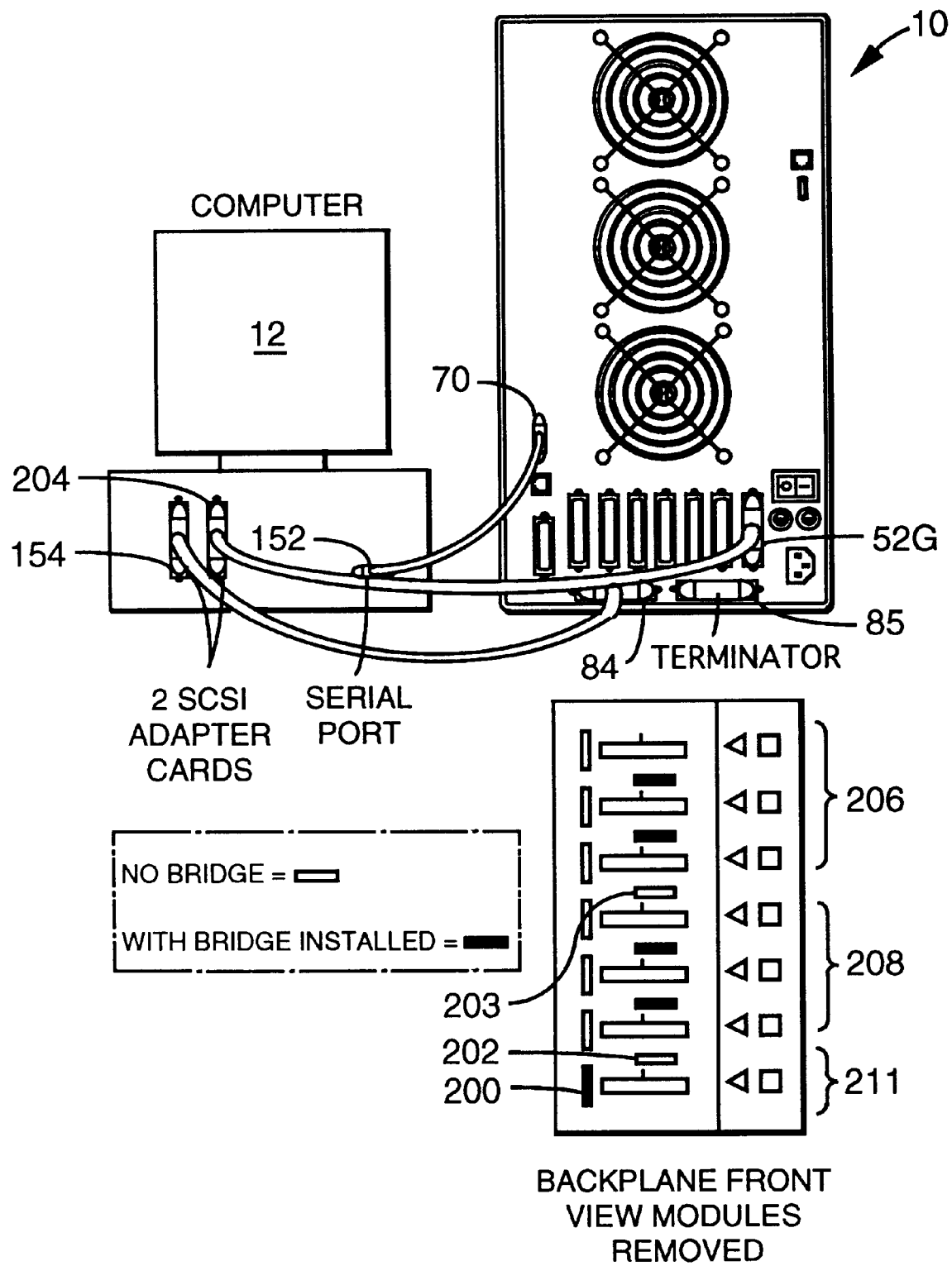

FIG. 22 shows the configuration in which the system 10 has both RAID set and non-RAID storage. In this specific example, the bottom drive 14G in the system 10 is designated as a non-RAID storage module. The vertical SCSI bridge 200 is installed with respect to drive 14G and the horizontal bridge is removed from socket 202. With the horizontal SCSI bridge removed from socket 203, two channels 206 and 208 of the RAID sets are defined. The controller port 84 is connected to the SCSI adapter card 154 and the other controller port 85 is terminated. The drive port 52G for drive 14G is connected directly to another SCSI adapter port 204 on the computer 12. The serial port 152 on the computer is connected to the serial port 70 on the ICU of the system 10. Accordingly, drives 14A–F form a two-channel RAID set of the system 10 and the drive 14G is a storage drive with no RAID function.

Figure 23:
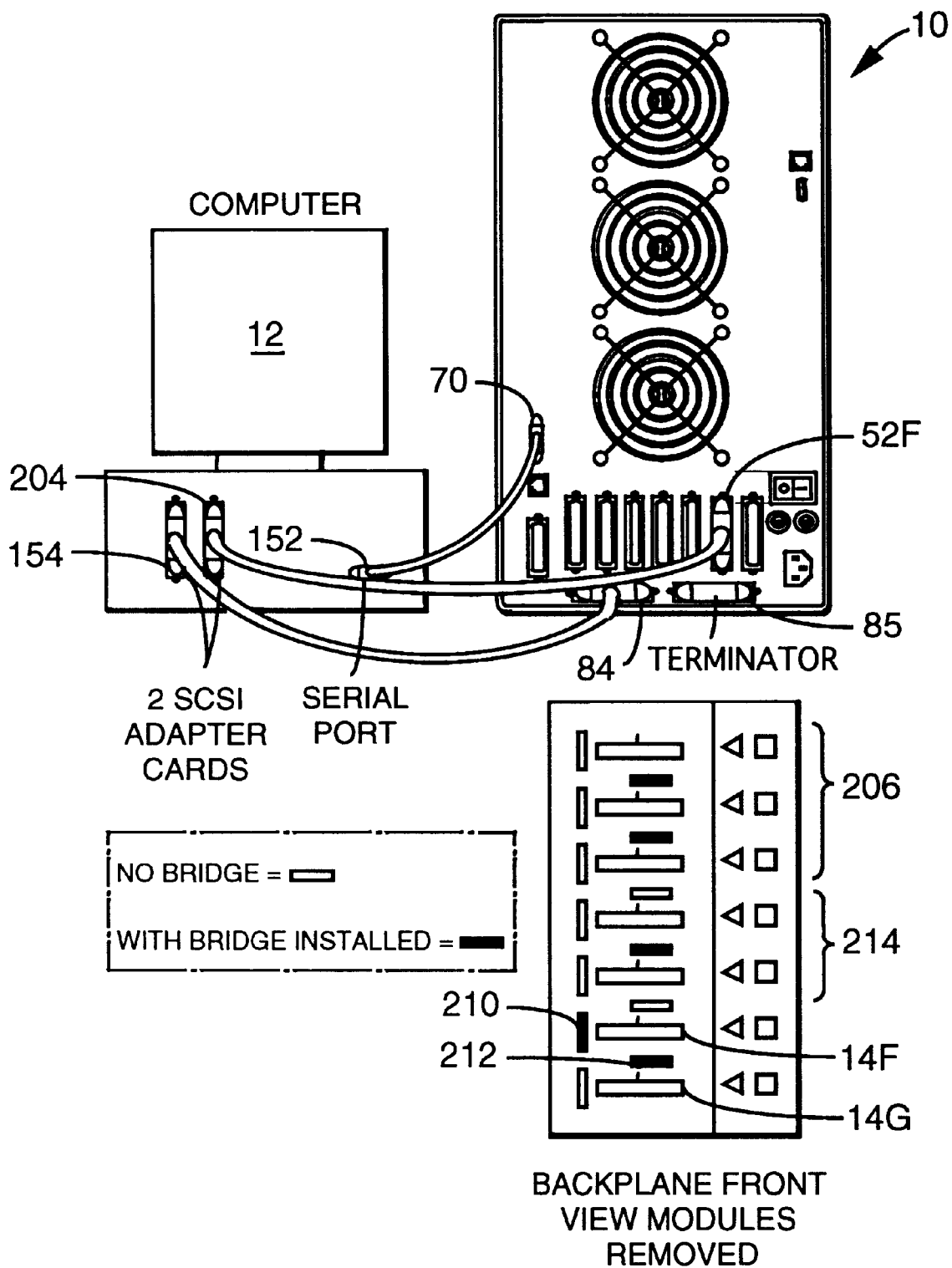

FIG. 23 shows a configuration which is quite similar to the configuration in FIG. 22 above, except that the non-RAID storage comprises two drives 14F and 14G in a single non-RAID channel 211. The vertical SCSI bridge 210 is installed for drive 14F instead, and the horizontal bridge 212 is installed between drives 14F and 14G. The second channel 214 of the RAID set includes one drive less than the second channel 208 in the RAID set configured in the system shown in FIG. 22.

Figure 24:
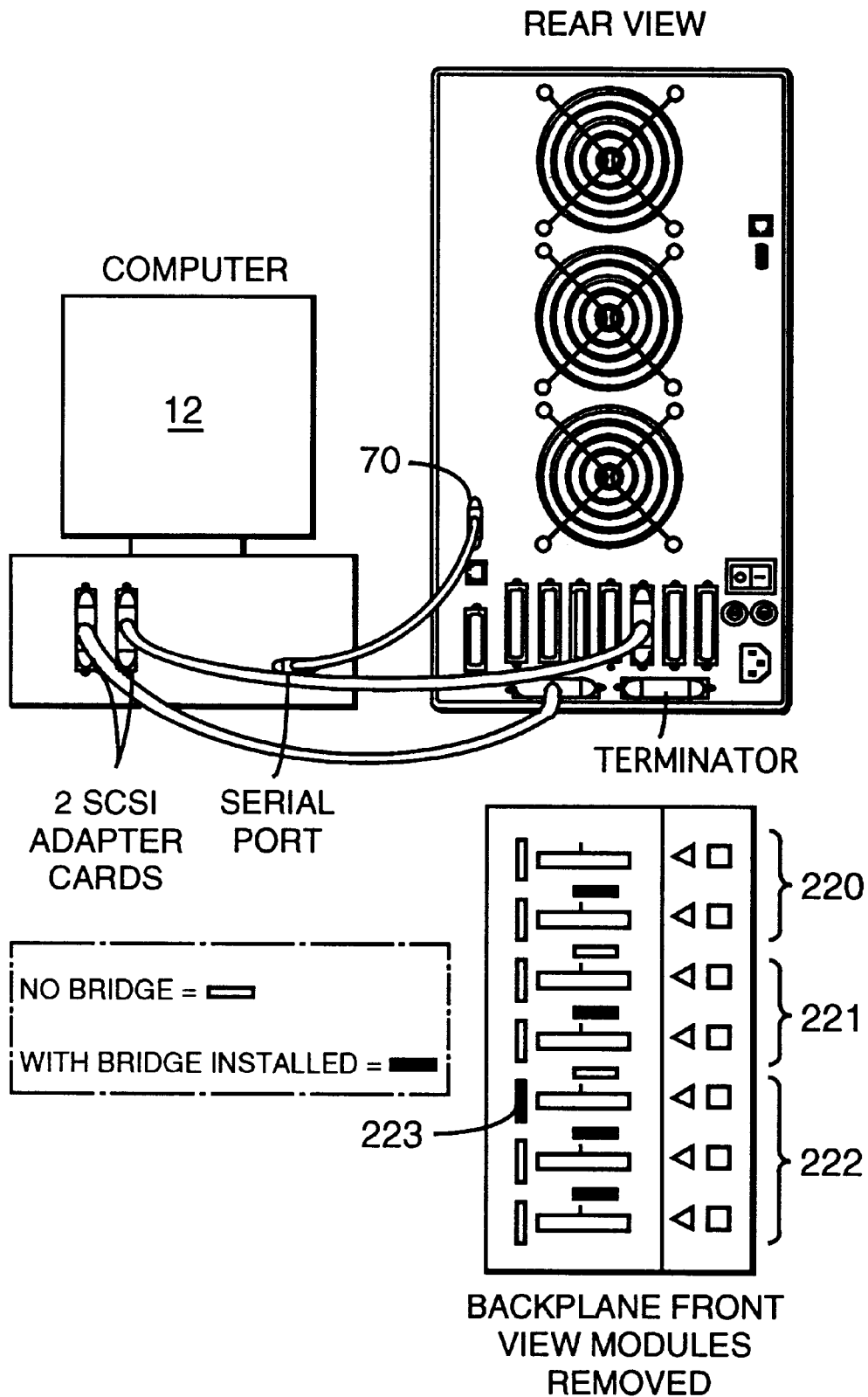

FIG. 24 is a further variation of the configuration in FIG. 22. The non-RAID channel 222 now includes three drives 14E–G. The two channels 220 and 221 in the RAID set each includes two drives. The vertical bridge 223 is in place, thus making the group of drives 222 a non-RAID configuration.

System configurations for all the foregoing RAID and non-RAID functions are implemented using the Utility Monitor software.

Monitor Utility

Figure 27:
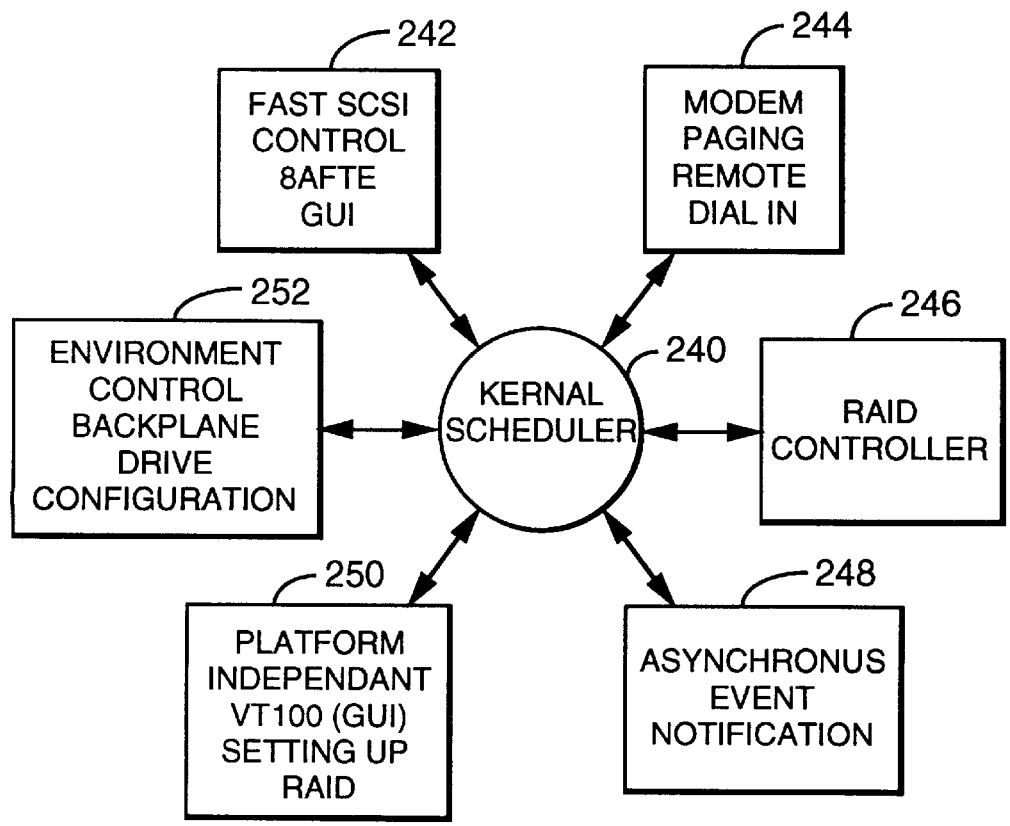
FIG. 27 is a schematic diagram illustrating the functional modules interfacing with the Utility Monitor.

FIG. 27 is a schematic diagram illustrating the functional modules interfacing with the Utility Monitor. The Utility Monitor has a kernel scheduler 240 which interfaces with the user interface (242). The scheduler 240 also interfaces with the modem for outgoing paging as well as incoming dial-in access by the system administrator (244). The RAID controller (246) receives RAID configuration setup instructions, for example, from the scheduler 240 and report disk failure, for example, to the scheduler. Other system component failure events, e.g., power supply and fan unit failure, temperature warning, etc., are noted by the scheduler 240 and reported in the form of audible alarm as well as paging (248). The scheduler interfaces with the host computer via emulated VT100 type terminals (250). Finally, at 252, the environment control/back plane drive configuration module interfaces with the scheduler 240.

At a user level, the Monitor Utility provides the following utility functions:

1. Enclosure status
2. RAID system status
3. RAID system setup
4. Drive and spare setup
5. Rebuild RAID set
6. Host interface setup
7. Advance Options
8. System shutdown The above stated functions may be identified as options in a menu in a user interface with different level of dialog boxes to allow the system administrator to select the function to be undertaken. Such user interface may be designed without undue experimentation given the disclosure of the functionality of each utility function herein. Each function will be explained below.

1. Enclosure Status

This utility function displays the status of the various components within the system housing, such as the status of the drive modules 14, the RAID controller 24, the power supply and fan units 28, ICU 22, system temperature, system voltage, etc. The information displayed is for monitoring purpose, and is not modifiable by the user.

2. RAID System Status

This utility function displays information about the drive modules 14 in the RAID system 10. This information includes the capacity of a module, the RAID set it belongs to, the SCSI ID it uses and the bus channel it is located on. The information displayed is for monitoring purpose, and is not modifiable by the user.

3. RAID System Setup

This function allows the system administrator to create a custom RAID set. A RAID set is created by selecting a RAID SET number, RAID Level, Stripe size and the drives to be included. Once a RAID set has been created, it will be recognized by the host computer as one drive. For example, if three 1 GB drives are selected for a (RAID level 0) RAID set, the system would see a single 3 GB drive.

4. Drive and Spare Setup

This utility option allows the system administrator to change the assigned SCSI ID for a slot, rescan the bus, designate a slot's mode of operation, spin a module up or down, and add/drop a spare drive or drive belonging to a RAID set. Each slot in the RAID system can be designated as RAID or non-RAID. A slot can only be changed to non-RAID mode when a drive slot has been configured as a non-RAID slot (see the discussion above in reference to cabling and configuring the SCSI bus). When the SCSI bridge 20 has been removed from the socket 102 on the back plane 21, the slot below the empty socket 102 becomes separated from both of the RAID controller's bus channels (see discussion above in reference to FIG. 16–24). The rescan bus feature is useful when a drive has been inserted in the RAID system after startup. It will rescan the SCSI bus so that the RAID controller will see the drive. The RAID controller only scans the bus during start-up and when the ICU reports an event such as a failed drive.

5. Rebuild RAID Set

This function allows the system administrator to select a redundant RAID set that has been degraded due to a failure and rebuild it. To rebuild the RAID set, it is necessary to have a "free" drive available in the RAID system. A free drive is one that does not belong to a RAID set and is not designated as a spare.

6. Host Interface Setup

This function allows the changing of certain host parameters. Specifically, this function allows the system administrator to change the selected SCSI ID and turn off or on tag command queuing.

7. Advance Options

This is an area reserved for any special functions. For example, a download function may be provided as an option here for downloading new firmware to the RAID controller 24 or ICU 22.

8. System Shutdown

By selecting system shutdown, the RAID controller will flush the data in its cache to disk so that the RAID system can be safely shutdown. A Restart System option is available which instructs the RAID controller to restart the RAID system after flushing the data in its cache to disk.

Creating a Custom RAID Set

If the RAID system is connected to a Narrow (8-bit) host SCSI adapter, as many as 8 RAID sets may be created using the Raid System Setup function of the Monitor Utility. If the RAID system is connected to a Wide (16-bit) host SCSI adapter, as many as 16 RAID sets may be created. Each RAID set number will be seen by the system as a single drive at the same SCSI ID number but as separate logical unit numbers. For example, for a RAID set that includes drive modules 14A to F, all six drive modules will be seen by the system as one drive. Any rewritable disk module inserted in the RAID system or connected thereafter can be included in a RAID set.

The RAID controller 24 supports RAID levels 0, 0+1, 1, 3, 5 and a standalone non-redundant mode ("just a bunch of drives" setting). RAID sets may include any drive connected to the controller, regardless of the drive's disk channel or SCSI ID.

Rebuilding a Drive

When a drive belonging to a data redundant RAID set (RAID level 1, 0+1, 3 or 5) fails to function, the RAID alerts the system administrator that the RAID set has been degraded. A degraded RAID set will continue to function normally until a second drive fails. This makes it imperative that the rebuild operation takes place as soon as possible. When the RAID system notices a degraded RAID set, it searches for a designated spare drive of equal or greater capacity. If one is found, the RAID system will immediately begin rebuilding data to the spare. It is not necessary for the designated spare drive to be located in the failed drive's position. The designated spare drive can be assigned any SCSI ID from 0–6 and physically connected to either of the RAID system's bus channel.

Disk Failure Detection

In addition to disk failures caused by an overheating condition, the RAID system 10 automatically detects SCSI disk failures arising from mechanical breakdown or data read/write errors (e.g., media errors). A monitoring process running on the RAID controller 24 checks, among other things, elapsed time on all commands issued to the disk drive modules 14. A time-out causes the disk module to be reset and the command to be retried. If the command times out again, the disk module 14 could be ignored by the controller (its state changed to dead). The RAID controller 24 also monitors SCSI bus parity errors and other potential problems. Any disk module with too many errors will also be ignored.

The disk modules 14 are programmed to report errors. When a disk module reports a media error during a read, the RAID controller 24 reads the data from the mirror (RAID 1), or computes the data from the other blocks (RAID 5), and writes the data back to the disk module that encountered the error. If the write fails (media error on write), the RAID controller 24 issues a reassign command to the disk module, and then writes the data to a new location. Since the problem has been solved, no error is reported to the system. Therefore, there is no "down-time".

Depending on the mode in which the drive modules are configured, the methods of removing a drive module from the system are different. For a drive module slot that has been configured and designated as a RAID unit, control of the latching and release of the module is entirely controlled by the ICU. The drive buttons 34 are disabled. To remove a drive, the Monitor Utility is invoked to spin down the desired drive, and then to actuate the latch mechanism to release the latch to the module. If the module has already spun down, the Monitor Utility actuates the latch mechanism to release the module. For a drive module slot that has been configured and designated as a non-RAID unit, the user can release the drive module by pressing the drive button 34. This will initiate a spin down process, followed by the release of the latch mechanism.

Given the foregoing operational characteristics, the present invention provides a novel approach to prevent the inadvertent removable of a wrong drive. In a RAID configuration, when a drive fails, the ICU is programmed such that the failed drive module is automatically spun down, turned off, and unlatched. The drive alarm flashes, the audible alarm sounds, and the SCSI ID display next to the failed drive flashes to indicate which drive has failed. (If error paging feature has been configured, the ICU will page the system administrator to report the failed drive.) The only drive that can be removed from the system is the one that has failed. This prevents the system administrator from inadvertently removing the wrong drive, which could have disastrous consequences. Losing a second drive in a redundant RAID system will cause all the data to be lost.

While the invention has been described with respect to the illustrated embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

We claim:

1. A user configurable redundant data storage array system comprising:

a plurality of storage modules;

a data bus having at least two segments;

connector means for coupling the data storage modules to the data bus;

configuration means for facilitating configuration of at least two of the data storage modules into a redundant array operating in a redundant storage mode and at least one of the data storage modules into a non-redundant array operating in a non-redundant storage mode, said configuration means comprising coupling means for facilitating configuration of the data bus to define one of a first section for said at least two data storage modules in the redundant array or a second section for said at least one data storage module in the non-redundant array, or both said first and second sections as desired;

wherein the coupling means comprises at least one removable electrical bridge for connecting said at least two segments of the data bus to form said first section or said second section;

a controller structured and configured to control operation of and data transfer to the redundant array from an external source, wherein the controller is coupled to the first section of the data bus; and a data connection means coupled to the second section of the data bus.

2. A user configurable redundant data storage array system as in claim 1, wherein the redundant array is configured to comprise at least two channels, wherein the segments in the first section of the data bus for said at least two channels are not connected by the coupling means.

3. A user configurable redundant data storage array system as in claim 1, wherein the controller is further structured and configured to monitor operational status of components within the system and report to a remote user when a component error has been detected.

4. A user configurable redundant data storage array system as in claim 3 wherein the controller is further structured and configured to allow the remote user to remotely access the system via a telecommunication channel to diagnose error and correct or bypass the error.

5. A user configurable redundant data storage array system, comprising:

at least three data storage modules;

a data bus comprising at least three segments;

means for coupling each data storage module to a segment;

at least one removable coupling bridge for coupling at least two segments into a first section;

a controller structured and configured to control the operation of and data transfer to the storage modules;

two of said at least three segments are coupled to the controller to form a redundant array of data storage modules in a redundant data storage mode, and one of said at least three segments forms a non-redundant array and is independent of the redundant array and accessible by an external data source; and said controller is coupled to the redundant array.

6. A user configurable redundant data storage array system as in claim 5, wherein said two of said at least three segments of the data bus are coupled by a removable electrical bridge to form said redundant array.

7. A user configurable redundant data storage array system as in claim 5, wherein said two of said at least three segments of the data bus are coupled by the controller to define two channels in the redundant array.

8. A user configurable redundant data storage array system as in claim 5, further comprising data connection means coupled to the data storage modules for facilitating coupling of the data storage modules in the non-redundant array to the external data source for storing data in a non-redundant data storage mode.

9. A user configurable redundant data storage array system comprising:

a plurality of storage modules;

a data bus having a plurality of non-interconnected segments associated with respective data storage modules;

coupling means integral with at least two of the plurality of segments and including respective removable electrical bridges;

wherein application of selected removable electrical bridges in the coupling means provides a redundant array of two or more data storage modules and a non-redundant array of one or more data storage modules;

an external data source;

a controller for selectively controlling the operation of and data transfer to the redundant array via the selectively applied removable electrical bridges; and means for connecting the non-redundant array to the external data source.

10. A user configurable redundant data storage array system as in claim 9 wherein:

each of the selected removable electrical bridges when applied interconnects respective adjacent segments and thus the respective data storage modules of the redundant array; and said controller is coupled to the data bus and thus said interconnected segments for controlling the data transfer between the external data source and the respective data storage modules.

11. A user configurable redundant data storage array system as in claim 9 wherein:

said connecting means include a coupling means and respective removable electrical bridge for selectively and individually connecting said one or more data storage modules of the non-redundant array to the external data source.

12. A user configurable redundant data storage array system as in claim 9 including:

means including an intelligent control unit coupled to the controller for interfacing to a remote user via a telecommunication channel for allowing monitoring of the system operational status, diagnosing error and correcting or bypassing the error remotely.

* * * * *